(12) United States Patent
Chou et al.

(10) Patent No.: US 12,519,521 B2
(45) Date of Patent: Jan. 6, 2026

(54) DOWNLINK MULTI-ANTENNA TRANSMISSION IN WIRELESS COMMUNICATION SYSTEM

(71) Applicant: MEDIATEK INC., Hsinchu (TW)

(72) Inventors: Kuan-Hung Chou, Hsinchu (TW); Chin-Kuo Jao, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 324 days.

(21) Appl. No.: 17/892,372

(22) Filed: Aug. 22, 2022

(65) Prior Publication Data

US 2023/0088818 A1 Mar. 23, 2023

Related U.S. Application Data

(60) Provisional application No. 63/243,230, filed on Sep. 13, 2021.

(51) Int. Cl.
*H04B 7/06* (2006.01)
*H04B 7/0456* (2017.01)
*H04L 5/00* (2006.01)

(52) U.S. Cl.
CPC ......... *H04B 7/0626* (2013.01); *H04B 7/0469* (2013.01); *H04B 7/0639* (2013.01); *H04L 5/0051* (2013.01)

(58) Field of Classification Search
CPC .. H04B 7/0626; H04B 7/0469; H04B 7/0639; H04L 5/0051; H04L 5/005; H04L 5/0057; H04L 5/0094
See application file for complete search history.

(56) References Cited

U.S. PATENT DOCUMENTS

| 10,218,423 | B2 | 2/2019 | Kang et al. |
| 2014/0254708 | A1* | 9/2014 | Seo ...................... H04B 7/0626 |
| | | | 375/267 |

(Continued)

FOREIGN PATENT DOCUMENTS

| CN | 110178326 A | 8/2019 |
| CN | 111213325 A | 5/2020 |

(Continued)

OTHER PUBLICATIONS

English Translation of KR-20160148495-A. (Year: 2024).*

(Continued)

*Primary Examiner* — Peter P Chau
(74) *Attorney, Agent, or Firm* — Helen Mao; Imperium Patent Works

(57) ABSTRACT

A method of channel state information (CSI) report can include receiving a CSI report configuration at a user equipment (UE) from a base station. The CSI report configuration indicates CSI reference signal (CSI-RS) resources configured for transmitting CSI-RSs from multiple transmission and reception points (TRPs). An CSI-RS measurement process can be performed at the UE based on the CSI-RSs transmitted from the multiple TRPs using the CSI-RS resources indicated by the CSI report configuration. A CSI report can be transmitted from the UE to the base station based on the CSI report configuration. The CSI report includes information of one or more phase differences or one or more amplitude differences among the CSI-RSs transmitted from the multiple TRPs.

17 Claims, 19 Drawing Sheets

(56) References Cited

U.S. PATENT DOCUMENTS

| | | | |
|---|---|---|---|
| 2017/0163325 A1* | 6/2017 | Kang | H04B 7/0619 |
| 2017/0201300 A1 | 7/2017 | Parkvall et al. | |
| 2019/0124534 A1 | 4/2019 | Yum et al. | |
| 2019/0356438 A1* | 11/2019 | Lee | H04B 7/0695 |
| 2020/0204239 A1* | 6/2020 | Kang | H04B 7/0632 |
| 2020/0403746 A1 | 12/2020 | Cheraghi et al. | |
| 2021/0391967 A1* | 12/2021 | Gao | H04L 5/0035 |
| 2023/0328569 A1* | 10/2023 | Khoshnevisan | H04B 7/0639 |
| | | | 370/252 |

FOREIGN PATENT DOCUMENTS

| | | | |
|---|---|---|---|
| CN | 111756419 A * | 10/2020 | H04B 7/0408 |
| KR | 20160148495 A * | 12/2016 | |
| WO | WO 2021/165767 A1 | 8/2021 | |

OTHER PUBLICATIONS

Combined Taiwanese Office Action & Search Report issued Jun. 28, 2023 in Taiwanese Application 111134509, 26 pages.
China Intellectual Property Office Action 202202211119753.5 Dated Jun. 27, 2025.

\* cited by examiner

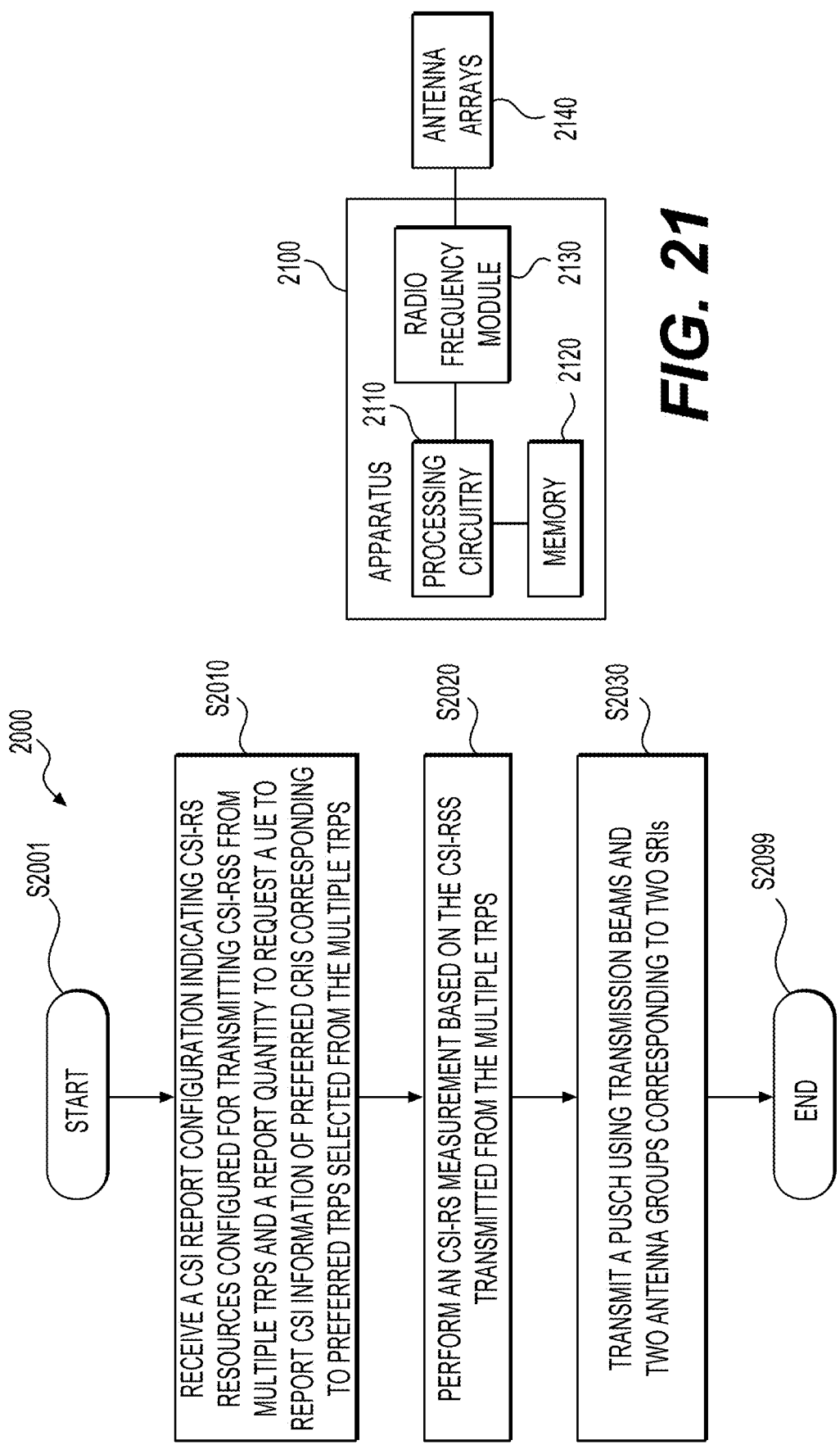

DOWNLINK MULTI-ANTENNA TRANSMISSION IN WIRELESS COMMUNICATION SYSTEM

INCORPORATION BY REFERENCE

This present application claims the benefit of U.S. Provisional Application No. 63/243,230, "Methods and Apparatus for Measurement and Transmission in Communication Systems", filed on Sep. 13, 2021, which is incorporated herein by reference in its entirety.

TECHNICAL FIELD

The present disclosure relates to wireless communications and specifically relates to multi-antenna transmission operations at the network and mobile devices in a wireless communication system.

BACKGROUND

A large number of steerable antenna elements can be employed for transmission and reception at the network side or the device side. At higher frequency bands, a large number of antenna elements can be used for beamforming to extend coverage. At lower frequency bands, a large number of antenna elements can be used to separate users spatially to increase the transmission capacity of the spectrum. Channel state information (CSI) for the operation of the massive multi-antenna schemes can be obtained by the feedback of the CSI report based on the transmission of reference signals in the downlink or uplink between the network and the mobile device.

SUMMARY

Aspects of the disclosure provide a method of channel state information (CSI) report. The method can include receiving a CSI report configuration at a user equipment (UE) from a base station. The CSI report configuration indicates CSI reference signal (CSI-RS) resources configured for transmitting CSI-RSs from multiple transmission and reception points (TRPs). An CSI-RS measurement process can be performed at the UE based on the CSI-RSs transmitted from the multiple TRPs using the CSI-RS resources indicated by the CSI report configuration. A CSI report can be transmitted from the UE to the base station based on the CSI report configuration. The CSI report includes information of one or more phase differences or one or more amplitude differences among the CSI-RSs transmitted from the multiple TRPs.

In an embodiment, the CSI-RS resources indicated by the CSI report configuration include multiple CSI-RS resources that are included in a CSI-RS resource set and correspond to the multiple TRPs, respectively. The information of one or more phase differences or one or more amplitude differences among the CSI-RSs transmitted from the multiple TRPs is represented, in the CSI report, as one or more phase differences or one or more amplitude differences among the multiple CSI-RS resources that are included in a CSI-RS resource set and correspond to the multiple TRPs.

In an embodiment, the information of one or more phase differences or one or more amplitude differences among the CSI-RSs transmitted from the multiple TRPs is represented by a UE-selected phase and amplitude compensation factor precoder.

In an embodiment, the CSI-RS resources indicated by the CSI report configuration include multiple CSI-RS resources that are included in a CSI-RS resource set and correspond to the multiple TRPs, respectively. The multiple CSI-RS resources that are included in a CSI-RS resource set and correspond to the multiple TRPs are organized into CSI-RS resource groups, each CSI-RS resource group including at least one of the multiple CSI-RS resources. The information of one or more phase differences or one or more amplitude differences among the CSI-RSs transmitted from the multiple TRPs is represented, in the CSI report, as one or more phase differences or one or more amplitude differences among the CSI-RS resource groups.

In an embodiment, the method can further include receiving a downlink control information (DCI) including a selection field for indicating measurement targets, the selection field indicating a codepoint in a CSI-RS resource combination table configured by radio resource control (RRC) and medium access control (MAC) control element (CE), the codepoint corresponding to a combination of a subset of the CSI-RS resources indicated by the CSI report configuration.

In an embodiment, the one or more phase differences or one or more amplitude differences among the CSI-RSs transmitted from the multiple TRPs in the CSI report correspond to at least one of two antenna polarizations of antennas of the UE.

In an embodiment, the one or more amplitude differences among the CSI-RSs transmitted from the multiple TRPs in the CSI report are represented as one or more transmit power differences from the multiple TRPs.

An embodiment of the method can further include transforming an arriving timing difference detected at the UE between two of the CSI-RSs transmitted from the multiple TRPs to a phase difference of the one or more phase differences among the CSI-RSs transmitted from the multiple TRPs in the CSI report.

In an embodiment, the CSI report configuration indicates the CSI report is a coherent joint transmission (C-JT) CSI report, and the CSI report includes a precoder matrix indicator (PMI) indicating a precoder that indicates the information of one or more phase differences or one or more amplitude differences among the CSI-RSs transmitted from the multiple TRPs.

In an embodiment, the CSI report configuration indicates the CSI report is a non-coherent joint transmission (NC-JT) CSI report. The CSI report includes multiple PMIs that correspond to CSI-RS resources in a CSI-RS resource set, respectively or correspond to CSI-RS resource groups of a CSI-RS resource set, and the CSI report further includes the information of the one or more phase differences or one or more amplitude differences among the CSI-RS resources in the respective CSI-RS resource set or the CSI-RS resource groups of the respective CSI-RS resource set.

An embodiment of the method can further include receiving a configuration indicating multiple combinations of CSI-RS resources in a CSI-RS resource set, members of each combination of the CSI-RS resources in the CSI-RS resource set belonging to different CSI-RS resource groups. The CSI report includes multiple PMIs that correspond to members of each combination of the CSI-RS resources in the CSI-RS resource set, respectively.

In an embodiment, the CSI-RS resources indicated by the CSI report configuration include a multiple-port CSI-RS resource in a CSI-RS resource set. The method further includes receiving a configuration that maps CSI-RS ports of the multiple-port CSI-RS resource to the multiple TRPs. The information of one or more phase differences or one or more amplitude differences among the CSI-RSs transmitted from the multiple TRPs is represented, in the CSI report, as one or more phase differences or one or more amplitude differences among the CSI-RS ports of the multiple-port CSI-RS resource corresponding to the respective ones of the multiple TRPs.

Aspects of the disclosure provide a method of multiple TRP transmission. The method can include receiving a configuration at a UE from a base station. The UE has two antenna groups. The configuration indicates a request that a first set of sounding reference signals (SRSs) be transmitted from first antennas of both the two antenna groups, and a second set of SRSs be transmitted from second antennas of both the two antenna groups. An SRS transmission process is performed by the UE following the configuration indicating the request.

In an embodiment, antennas of each antenna group have a same polarization. In an embodiment, antennas of each antenna group having two polarizations, the first antennas of both the two antenna groups have a first one of the two polarizations, and the second antennas of both the two antenna groups have a second one of the two polarizations.

Aspects of the disclosure provide another method of CSI report. The method can include receiving a CSI report configuration at a UE from a base station, the CSI report configuration indicating CSI reference signal (CSI-RS) resources configured for transmitting CSI-RSs from multiple TRPs, the CSI report configuration indicating a report quantity to request the UE to report CSI information of preferred CSI-RS resource indicators (CRIs) corresponding to ones of the CSI-RS resources indicated by the CSI report configuration, the preferred CRIs corresponding to preferred TRPs selected from the multiple TRPs by the UE or the base station; performing at the UE a CSI-RS measurement based on the CSI-RSs transmitted from the multiple TRPs using the CSI-RS resources indicated by the CSI report configuration; and transmitting from the UE to the base station a CSI report based on the CSI report configuration, the CSI report indicating the preferred CRIs corresponding to the preferred TRPs selected from the multiple TRPs by the UE or the base station and the CSI information associated with the preferred CRIs.

An embodiment of the method can further include receiving from the base station at the UE an indication of base-station-selected one or more combinations of CSI-RS resources that are a subset of the CSI-RS resources indicated by the CSI report configuration. The CSI report provides CSI corresponding to each of the base-station-selected one or more combinations of the CSI-RS resources, each of the base-station-selected one or more combinations of CSI-RS resources being represented, in the CSI report, by a bitmap or an indicator provided in the CSI report configuration, the base-station-selected one or more combinations of CSI-RS resources corresponding to the preferred CRIs.

the CSI report indicates UE-selected one or more combinations of the CSI-RS resources as preferred combinations of the CSI-RS resources and provides CSI corresponding to each of the preferred combinations of the CSI-RS resources, each of the preferred combinations of the CSI-RS resources being represented, in the CSI report, by a bitmap or an indicator provided in the CSI report configuration, the preferred combinations of the CSI-RS resources corresponding to the preferred CRIs.

In an embodiment, the CSI report indicates a precoder corresponding to a combination of one or more un-preferred TRPs selected from the multiple TRPs by the UE or the base station. In an embodiment, the CSI report configuration indicates a report of a TRP selection matrix $W_0$ from the UE. The CSI report includes a TRP selection indicator to represent the TRP selection matrix $W_0$, the TRP selection indicator being in a range of $\{0, 1, 2, \ldots,$ $$\binom{N_p}{N'_p}\},$$

where $N_p$ is a number of the multiple TRPs configured by the base station, $N'_p$ is a number of the preferred TRPs selected from the multiple TRPs by the UE, and $$\binom{N_p}{N'_p}$$

is a number of the combinations of selecting $N'_p$ TRPs from $N_p$ candidate TRPs.

In an example, the CSI information in the CSI report indicates a precoder corresponding to the preferred TRPs and selected from a downlink Type II codebook having a codebook structure of $W=W_0W_1W_2 W_f^H$, $W_0$ being the TRP selection matrix, $W_1$ representing wideband spatial domain (SD) basis vectors, $W_2$ representing frequency domain (FD) compressed coefficients linearly combining the SD basis vectors to form transmission layers, and $W_f^H$) representing DFT vectors used for FD compression, and elements in the matrices $W_1$, $W_2$, and $W_f^H$ related to non-selected TRPs among the multiple TRPs are not reported in the CSI report.

In an example, the CSI information in the CSI report indicates a precoder corresponding to the preferred TRPs and selected from a downlink Type II codebook having a codebook structure of $W=W_1W_0W_2W_f^H$, $W_0$ being the TRP selection matrix, $W_1$ representing wideband spatial domain (SD) basis vectors, $W_2$ representing frequency domain (FD) compressed coefficients linearly combining the SD basis vectors to form transmission layers, and $W_f^H$) representing DFT vectors used for FD compression, and elements in the matrices $W_2$ and $W_f^H$ related to non-selected TRPs among the multiple TRPs are not reported in the CSI report.

BRIEF DESCRIPTION OF THE DRAWINGS

Various embodiments of this disclosure that are proposed as examples will be described in detail with reference to the following figures, wherein like numerals reference like elements, and wherein:

FIG. 20 shows a process 2000 for dynamic TRP selection according to embodiments of the disclosure.

FIG. 21 shows an exemplary apparatus 2100 according to embodiments of the disclosure.

DETAILED DESCRIPTION OF EMBODIMENTS

I. Multi-Antenna Operations

1. Reference Signals and Channel State Information (CSI)

In some embodiments, knowledge of a radio link can be obtained by measurement of reference signals transmitted over the radio link during a channel sounding process. The reference signals in a downlink direction can be referred to as channel-state-information reference signals (CSI-RS). The reference signals in an uplink direction can be referred to as sounding reference signals (SRS).

A CSI-RS can be configured on a per-device basis. A configured CSI-RS may correspond to one or multiple different antenna ports (referred to as CSI-RS ports). Each CSI-RS port can correspond to a channel to be sounded. For example, a multi-port CSI-RS can include 32 per-antenna-port CSI-RS that are orthogonally transmitted on 32 CSI-RS ports. Each per-antenna-port CSI-RS corresponds to a CSI-RS port.

A CSI-RS can be configured for a particular bandwidth (such as a bandwidth part). Within the configured bandwidth, a CSI-RS can be configured for every N resource block. N can be 1, 2, 3, or the like. Within a resource block, a CSI-RS may occupy a set of one or more element resources within a time slot. For a multi-port CSI-RS, the set of element resources are shared by the multiple per-antenna-port CSI-RS, for example, based on a combination of code-domain sharing (CDM), frequency-domain sharing (FDM), or time-domain sharing (TDM).

A device can be configured with one or several CSI-RS resource sets. Each resource set can include one or more configured CSI-RS. Each resource set may also include pointers to a set of New Radio (NR) synchronization signal (SS) blocks. A CSI-RS resource set can be configured for periodic, semi-persistent, or aperiodic transmission. For example, the semi-persistent CSI-RS transmission can be activated or deactivated based on a MAC control element (CE). The aperiodic CSI-RS transmission can be triggered by means of downlink control information (DCI).

Similarly, an SRS can support one or more antenna ports (referred to as SRS ports). Different SRS ports of the SRS can share a same set of resource elements and a same basis SRS sequence. Different rotations can be applied to separate the different SRS ports. Applying a phase rotation (or phase shift) in the frequency domain is equivalent to applying a cyclic shift in the time domain. Similar to CSI-RS, a device can be configured with one or several SRS resource sets. Each resource set can include one or several configured SRS. An SRS resource set can be configured for periodic transmission, semi-persistent transmission (controlled by a MAC CE), or aperiodic transmission (triggered by a DCI).

Figure 1:
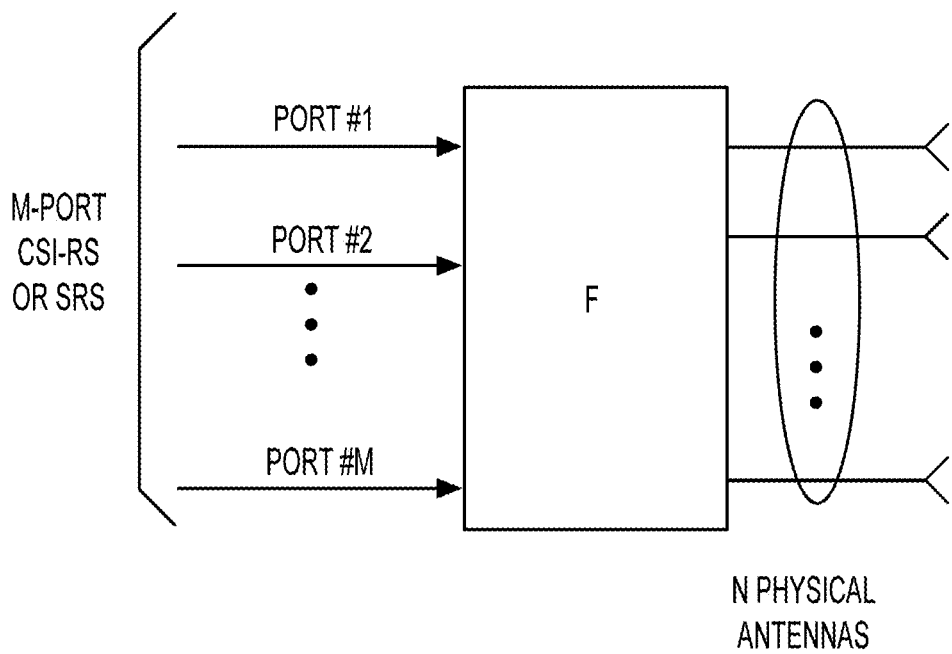
FIGS. 1-3 show examples of mapping channel state information reference signal (CSI-RS) ports or sounding reference signal (SRS) ports to physical antennas.
Figure 2:
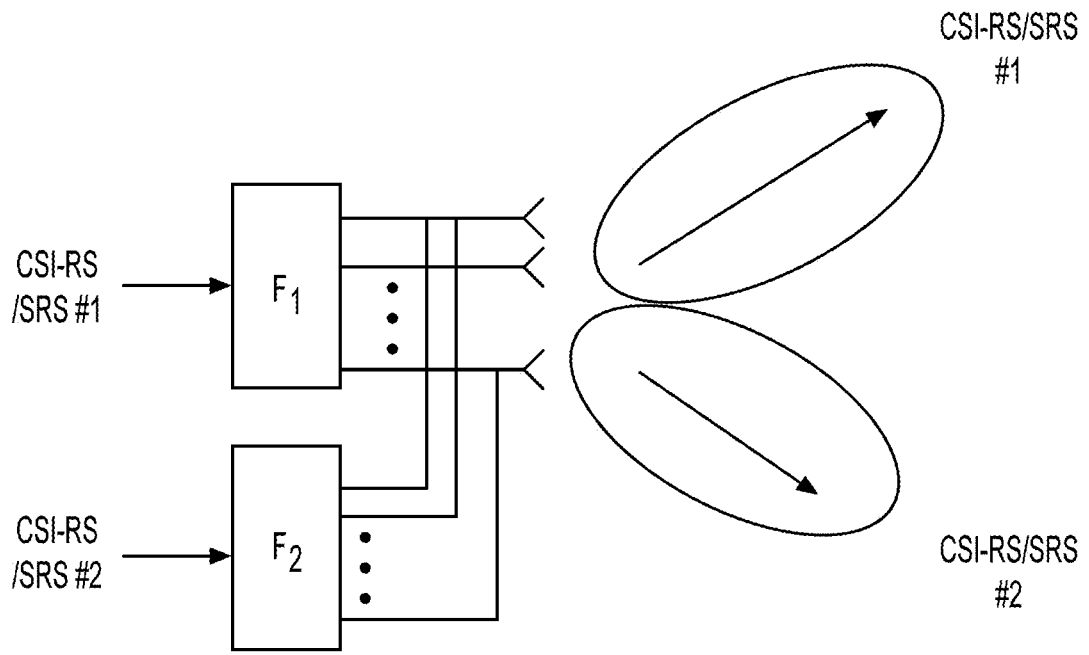
Figure 3:
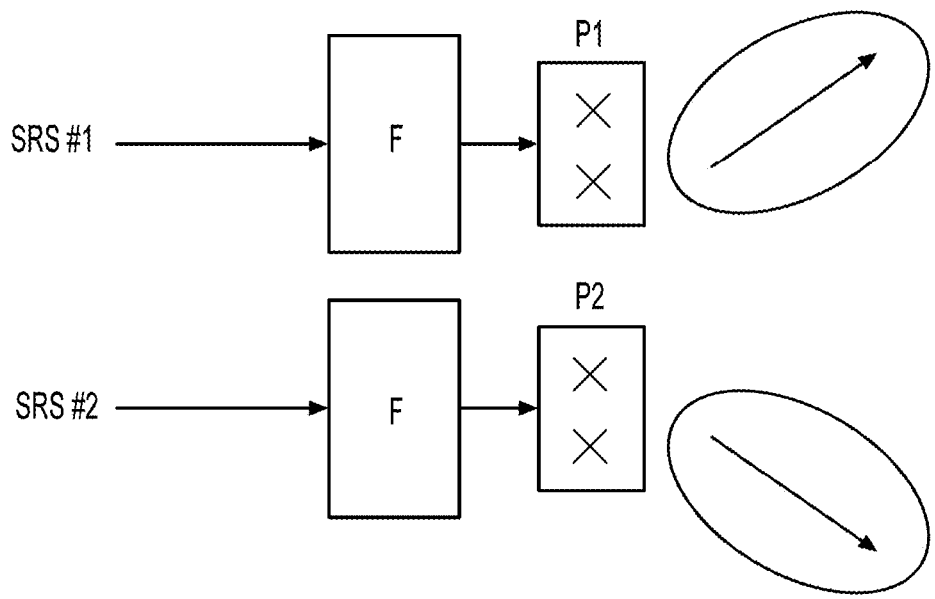

FIGS. 1-3 show examples of mapping CSI-RS ports or SRS ports to physical antennas. In the FIG. 1 example, an M-port CSI-RS or SRS (CSI-RS/SRS) corresponds to M antenna ports (CSI-RS ports or SRS ports). The M antenna ports are connected to N physical antennas through a spatial filter (labeled F). The M-port CSI-RS/SRS are processed by a spatial filter before being mapped to the N physical antennas. Due to the spatial filtering, one or more transmission beams can be formed for transmission of the M-port CSI-RS/SRS. Typically, N can be larger than M.

In the FIG. 2 example, two CSI-RS/SRS #1 and #2 are applied with two separate spatial filters F1 and F2 but transmitted over a same set of physical antennas at a same time or different times. Due to the spatial filtering, the two CSI-RS/SRS #1 and #2 are beamformed in different directions.

In the FIG. 3 example, multiple antenna panels are employed for transmission. Two CSI-RS/SRS #1 and #2 are processed with two separate spatial filters F1 and F2 and transmitted over two antenna panels P1 and P2, respectively, at a same time or different times. Due to the spatial filtering and the respective antenna pannels, the two CSI-RS/SRS #1 and #2 are beamformed in different directions.

As shown in the examples of FIGS. 1-3, a channel being sounded based on a CSI-RS/SRS is not a physical radio channel but a channel corresponding to a CSI-RS port or an SRS port.

In some embodiments, a network (e.g., a base station) can configure a report configuration to a device. The device can perform a channel measurement and report measurement results to the network based on the report configuration. For example, the report configuration can specify a set of quantities to be reported. The quantities can include channel-quality indicator (CQI), rank indicator (RI), and precoder-matrix indicator (PMI), jointly referred to as channel-state information (CSI). The quantities can also include reference-signal received power (RSRP) reflecting a received signal strength.

The report configuration can further specify downlink resource(s) one which measurements can be performed to derive the specified quantities. For example, the report configuration may describe one or more CSI-RS resource sets each including one or more CSI-RS. For example, a single multi-port CSI-RS can be configured for reporting a combination of CQI, RI, and PMI for link adaptation and multi-antenna precoding. Multiple CSI-RS can be configured for beam management, and each CSI-RS can be beamformed and transmitted in different direction. In some scenarios, a device may perform measurements based on the configured resources without reporting. For example, a device may perform measurement for receiver-side beamforming and multi-antenna precoding without reporting.

The report configuration can further describe when and how the reporting be carried out. For example, the reporting can be periodic, semi-persistent, or aperiodic. The reporting can be activated (deactivated) based on MAC CE or triggered by means of DCI. The measurement results for periodic and semi-persistent reporting can be carried in a physical uplink control channel (PUCCH). The measurement results for aperiodic reporting can be carried in a physical uplink shared channel (PUSCH).

2. Multi-Antenna Transmission

A. Digital and Analog Multi-Antenna Processing

Figure 4:
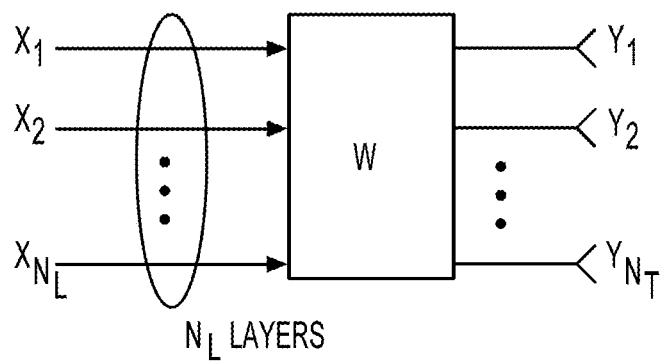
FIG. 4 shows a linear multi-antenna transmission scheme in a transmitter according to embodiments of the disclosure.

FIG. 4 shows a linear multi-antenna transmission scheme in a transmitter according to embodiments of the disclosure. As shown, $N_L$ layers of data (such as modulation symbols) are mapped to $N_T$ transmit antennas by means of multiplication with a transmission matrix W of size $N_T \times N_L$. The vector X represents the $N_L$ layers of data. The vector Y represents $N_T$ signals corresponding to the $N_T$ antennas.

In various examples, the multi-antenna processing, represented by the matrix W, can be applied in an analog part of a transmitter chain or a digital part of the transmitter chain. Or, a hybrid approach can be adopted where the multi-antenna processing can be applied in both the analog and digital parts of the transmitter chain. Accordingly, a multi-antenna processing can be an analog multi-antenna processing, a digital multi-antenna processing, or a hybrid multi-antenna processing in various embodiments.

Figure 5:
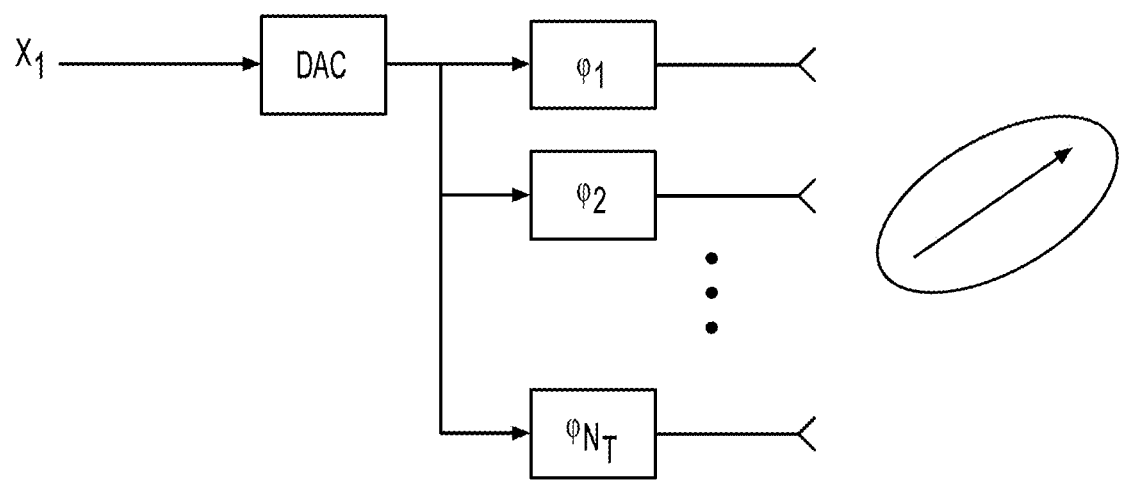
FIG. 5 shows an example of analog multi-antenna processing.

In the case of analog processing, a spatial filter, F, can be applied to provide per-antenna phase shifts to form a transmission beam. FIG. 5 shows an example of analog multi-antenna processing. In some examples, analog processing is carried out on a per-carrier basis for downlink transmission. Thus, no frequency multiplex beam-formed transmissions are performed towards devices located in different directions relative to a base station. To cover different devices located in different directions, a beam sweeping is performed by the analog processing.

In the case of digital processing, each element of the transmission matrix W can include both a phase shift and a scale factor, which provides a higher flexibility for controlling beamforming directions. For example, simultaneous multi-beam beamforming can be obtained to cover multiple devices located in different directions relative to a base station. A transmission matrix W used in digital multi-antenna processing is referred to as a precoder matrix. The corresponding multi-antenna processing is referred to as multi-antenna precoding.

Figure 6:
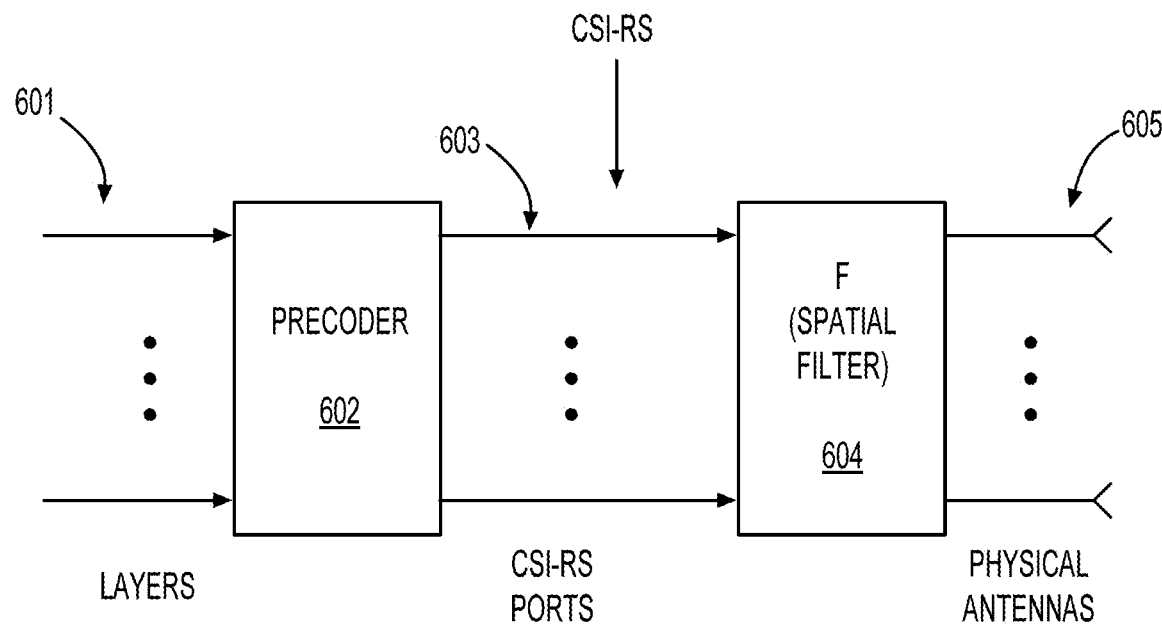
FIG. 6 shows an example of hybrid multi-antenna processing according to some embodiments of the disclosure.

A precoder and a spatial filter can be sequentially connected in hybrid multi-antenna processing to form directional transmission beams. FIG. 6 shows an example of hybrid multi-antenna processing according to some embodiments of the disclosure. As shown, layers of modulation symbols 601 are mapped to CSI-RS antenna ports 603 by means of a precoder 602. Outputs from the precoder 602 are mapped to physical antennas 605 by means of a spatial filter (F) 604. In some examples, the spatial filter 604 is used to form a broader beam, while the precoder 602 is used to form one or more narrower beams along the direction of the broader beam. By selecting a specific precoder 602 and a spatial filter 604, a transmitter can determine one or more beams to cover one or more receivers distributed at different locations.

Similar to transmitter side processing, a receiver can apply analog, digital, or hybrid multi-antenna processing for beam-formed reception of signals arriving from different directions.

B. Downlink Multi-Antenna Precoding

In some embodiments, to support network selection of precoder for downlink transmission (such as physical downlink shared channel (PDSCH) transmission), a device can perform measurement based on CSI-RS and report measurement results (such as a CSI report) to the network based on configurations (such as a CSI report configuration) received from the network. The network can then determine a precoder(s) based on the measurement results.

In some examples, a CSI report can include a rank indicator (RI), a precoder-matrix indicator (PMI), a channel-quality indicator (COI), or the like. The RI can indicate a suitable transmission rank (a number of transmission layer $N_L$) for downlink transmission. The PMI can indicate a suitable precoder matrix M corresponding to the selected rank. The CQI can indicate a suitable channel-coding rate and modulation scheme given the selected precoder matrix.

In some embodiments, a value of the PMI can correspond to one specific precoder matrix selected from a precoder codebook. The precoder codebook provides a set of candidate precoder matrices. In addition to the number of transmission layer $N_L$, the device selects a PMI based on a certain number of antenna ports ($N_{RS}$) of configured CSI-RS associated with the CSI report configuration. In an example, at least one codebook is provided for each valid combination of $N_T$ and $N_L$.

In some embodiments, two types of CSI are defined corresponding to different scenarios: Type I CSI and Type II CSI. Different types of CSI are associated with different sets of precoder codebooks having different structures and sizes.

The code books for Type I CSI can be relatively simple and aim at focusing transmitted energy at a target receiver. The type I CSI can include two subtypes: Type I single-panel CSI and Type I multi-panel CSI. The two subtypes correspond to different antenna configurations on a network or transmitter side. The codebooks for Type II CSI can provide channel information with higher spatial granularity than Type I CSI. Type II CSI can target a multi-user Multiple-Input Multiple-Output (MIMO) (MU-MIMO) scenario.

C. Uplink Multi-Antenna Processing

In some embodiments, a device can be configured in two different modes for uplink (PUSCH) multi-antenna precoding: codebook-based transmission and non-codebook-based transmission. The selection between these two modes can partly depend on whether uplink/downlink channel reciprocity can be assumed.

Typically, codebook-based precoding can be used when uplink/downlink reciprocity does not hold. For example, a device configured for codebook-based PUSCH can typically be configured for transmission of one or more multi-port SRS. The network measures the uplink channel based on the configured SRS and determines a suitable uplink precoding. The network decides on an uplink transmission rank (a number of layers to be transmitted) and a corresponding precoder matrix to use for the transmission. For example, the network can select a precoder matrix from a set of available precoders (an uplink codebook) based on a given combination of a number of antenna ports $N_{RS}$ (SRS ports of a configured SRS) and the transmission rank.

The network informs the device about the selected rank and precoder matrix in an uplink scheduling grant. The device accordingly applies the precoder matrix for a scheduled PUSCH transmission, mapping the indicated number of layers to respective SRS antenna ports.

Figure 7:
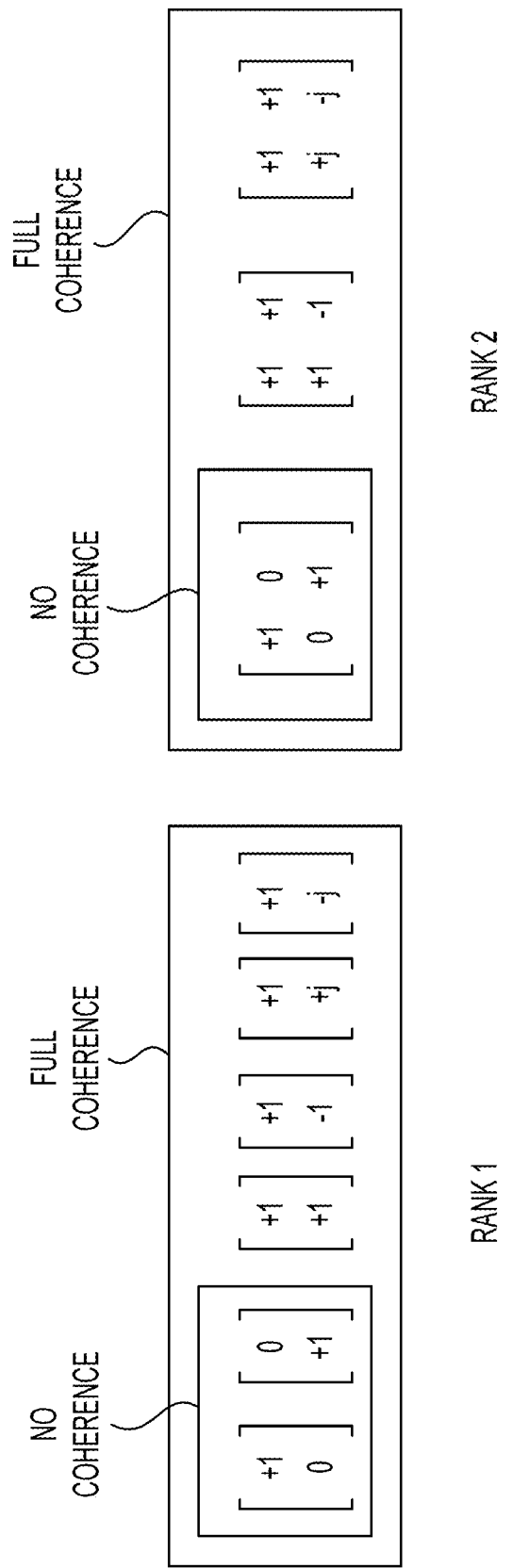
FIG. 7 shows an example of available precoder matrices (two codebooks) for a case of two antenna ports according to an embodiment of the disclosure.

FIG. 7 shows an example of available precoder matrices (two codebooks) for a case of two antenna ports according to an embodiment of the disclosure. The first codebook (the left one) corresponds to single-rank transmission, while the second codebook (the right one) corresponds to rank-2 transmission. Different candidate precoder matrices are available depending on the antenna-port coherence property of the two antenna ports.

In some examples, a device can be configured with multiple antenna panels towards different directions relative to the device. Each antenna panel can include an array of cross-polarized antenna elements. For each antenna panel, different transmission beams can be formed by applying different spatial filters, F, between a set of SRS antenna ports and the array of cross-polarized antenna elements. During uplink channel sounding, multiple multi-port SRS can be transmitted from the device. Each of the multiple multi-port SRS can correspond to a beam (that corresponds to a respective spatial filter and a respective antenna panel).

After a measurement based on the transmitted SRS, the network can feedback an SRS resource indicator (SRI) together with an RI and a TPMI to the device, for example, as part of a DCI. (A PMI for uplink precoder can be referred to as a transmission PMI (TPMI).) The device can then perform a PUSCH transmission using the precoder indicated by the TPMI and the antenna panel and the spatial filter corresponding to the indicated SRI.

Figure 8:
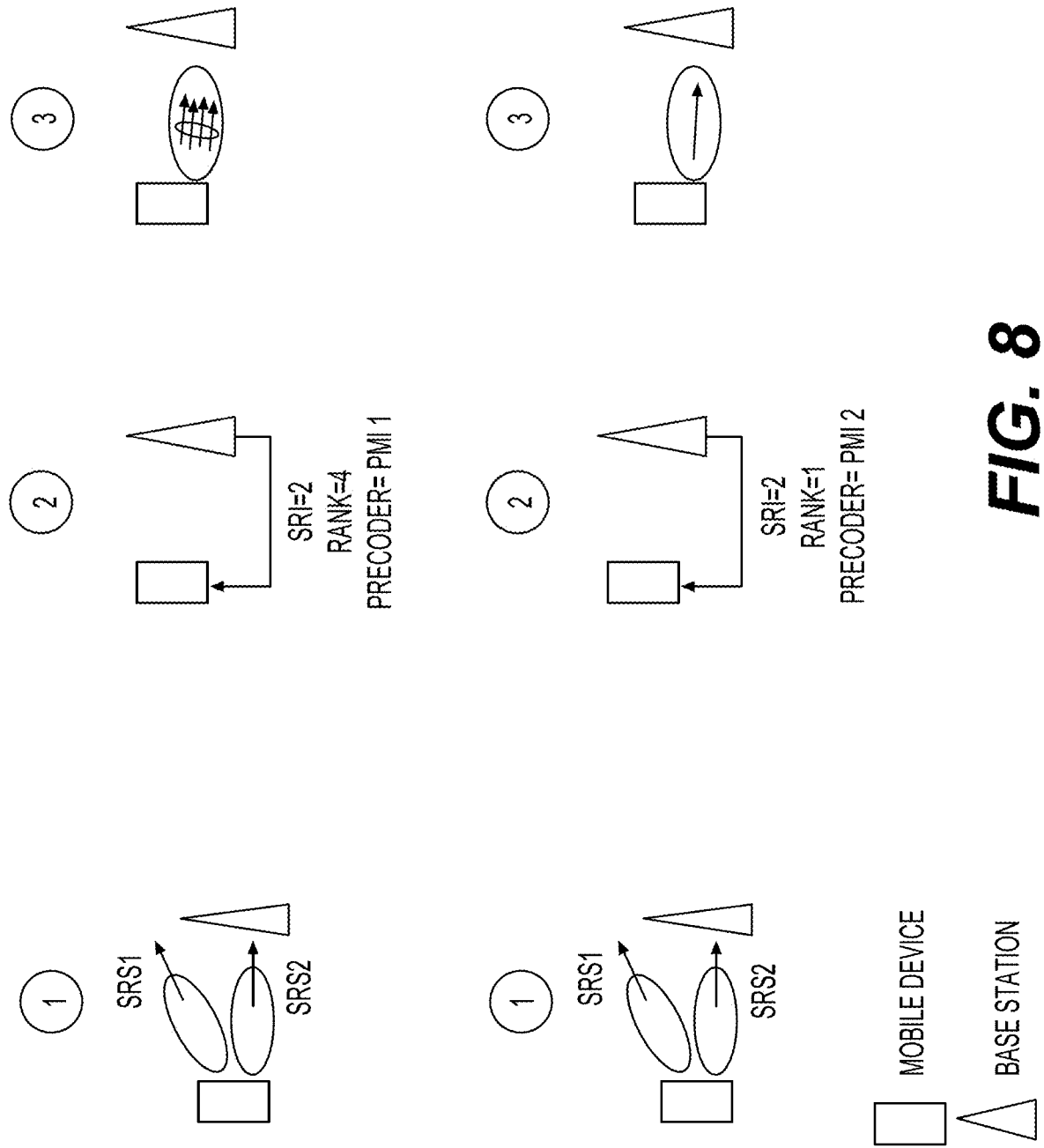
FIG. 8 shows two examples (upper part and lower part) of uplink codebook-based transmission according to embodiments of the disclosure.

FIG. 8 shows two examples (upper part and lower part) of uplink codebook-based transmission according to embodiments of the disclosure. The two examples can each include three steps labeled with 1, 2, and 3. In both examples, a mobile device transmits two SRS, SRS 1 and SRS 2, along two beam directions to a base station. For example, the two beam directions can correspond to two antenna panels.

In the upper example, the base station feedbacks SRI=2, Rank=4, and Precoder 1. Accordingly, the mobile device can perform a rank-4 transmission with Precoder 1 over a beam corresponding to SRS 2 indicated by SRI=2. In the lower example, the base station feedbacks SRI=2, Rank=1, and Precoder 2. Accordingly, the mobile device can perform a single-rank transmission with Precoder 2 over a beam corresponding to SRS 2 indicated by SRI=2. As shown, the SRI received from the network determines what beam/panel to use for the transmission, while the precoder information (the number of layers and the precoder) determines how the transmission is performed within the selected beam.

Figure 9:
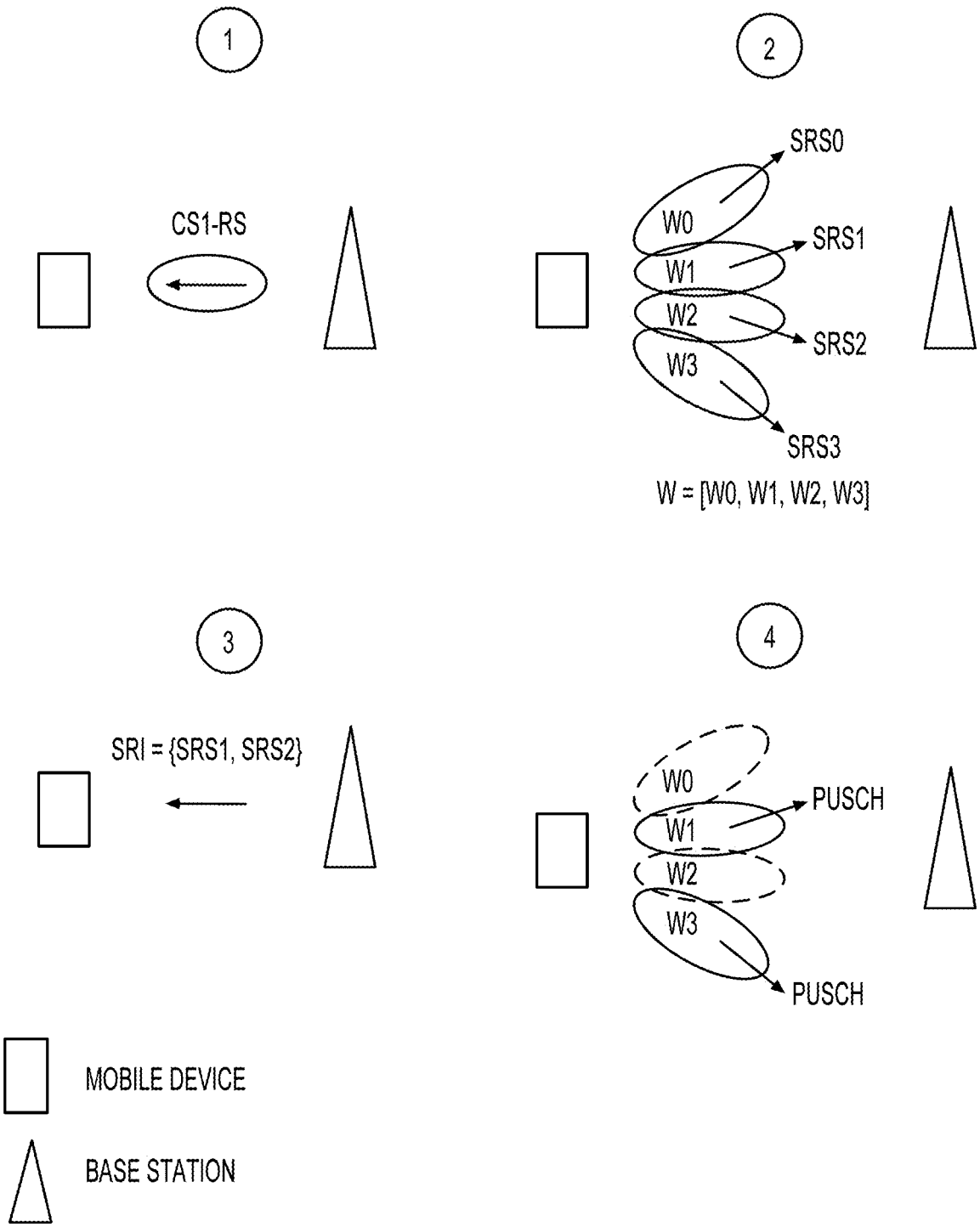
FIG. 9 shows an example of uplink non-codebook-based transmission according to some embodiments of the disclosure.

Non-codebook-based precoding can be used when an assumption of channel reciprocity holds. The device can acquire detailed knowledge of an uplink channel based on downlink measurement and select an uplink multi-layer precoder. FIG. 9 shows an example of uplink non-codebook-based transmission according to some embodiments of the disclosure. The example shows four steps labeled from 1 to 4 performed by a device and a base station.

In the first step, the device measures a configured CSI-RS transmitted from the network (a base station). The device can determine a precoder based on the measurement results. For example, the precoder can be a precoder matrix W=[w1, w2, w3, w4], where w1, w2, w3, and w4 represent four column vectors corresponding to four layers (rank-4 transmission). Each column of the precoder matrix W can be seen as defining a digital beam for transmission of the respective layers.

In the second step, the device applies the selected precoder to a set of four configured SRS with one SRS transmitted on each layer (or beam) defined by the precoder. The network can perform measurements based on the set of SRS. As shown, four SRS, {SRS0, SRS1, SRS2, SRS3}, are transmitted along four beams corresponding to w1, w2, w3, and w4.

In the third step, based on measurements on the received SRS, the network can decide to modify the device-selected precoder for a specific scheduled PUSCH transmission. For example, the network can select a subset of precoder beams from the set of four beams. The network can then indicate the beam selection by indicating a subset of preconfigured SRS within an SRS resource indicator (SRI) included in a scheduling grant associated with the PUSCH. As shown, the SRI={SRS1, SRS3} is transmitted from the network to the device.

In the last step, the device carries out the scheduled PUSCH transmission using a reduced precoder W=[w1, w3](rank-3 transmission). As shown, the PUSCH is transmitted along two beams corresponding to w1 and w3.

During the above process, the uplink precoder originally decided by the device is optimized by the network based on the measurements by the network. The first step of CSI-RS transmission for downlink channel sounding and the second step of SRS transmission for indicating the selected uplink precoder can be performed periodically. The last two steps of SRI indication and PUSCH transmission can be performed for each scheduled PUSCH transmission.

II. Multiple-TRP Downlink Codebook and Feedback Enhancement

1. Codebook Enhancement for Largely-Spaced Panels/TRPs Based on CSI-RS

Multiple largely-spaced (distributed) transmission and reception points (TRPs) can operate in a coherent joint transmission (CJT) mode or a non-coherent joint transmission (NCJT). In NCJT, different layers can be transmitted from multiple TRPs without coordination among the multiple TRPs. Interlayer interference may reduce throughput and coverage. In CJT, multiple TRPs can be controlled to operate coordinately. Thus, signals from different TRPs can be constructively interfered with each other to improve throughput and coverage, and interlayer interference can be reduced. To support CJT from multiple TRPs, co-phasing and amplitude (or power) differences among the TRPs can be measured and reported from a mobile device to a network. Based on such reported information, the network can control the TRPs to perform coherent joint transmission.

In the present disclosure, the terms "TRP", "antenna panel (or panel)", "antenna group (or port group)", "cell", and "sector" may be used interchangeably to refer to a group of co-located antennas. The techniques, methods, processes, procedures, examples, or embodiments disclosed using a TRP or a panel as an example can also be applied to an antenna group, a cell, or a sector. In deployment, a sector may correspond to one or more cells, a cell may correspond to one or more TRPs, and a TRP may correspond to one or more antenna panels. However, each of a sector, a cell, a TRP, or a panel can be treated as a group of antennas for applying the technologies disclosed herein.

Figure 10A:
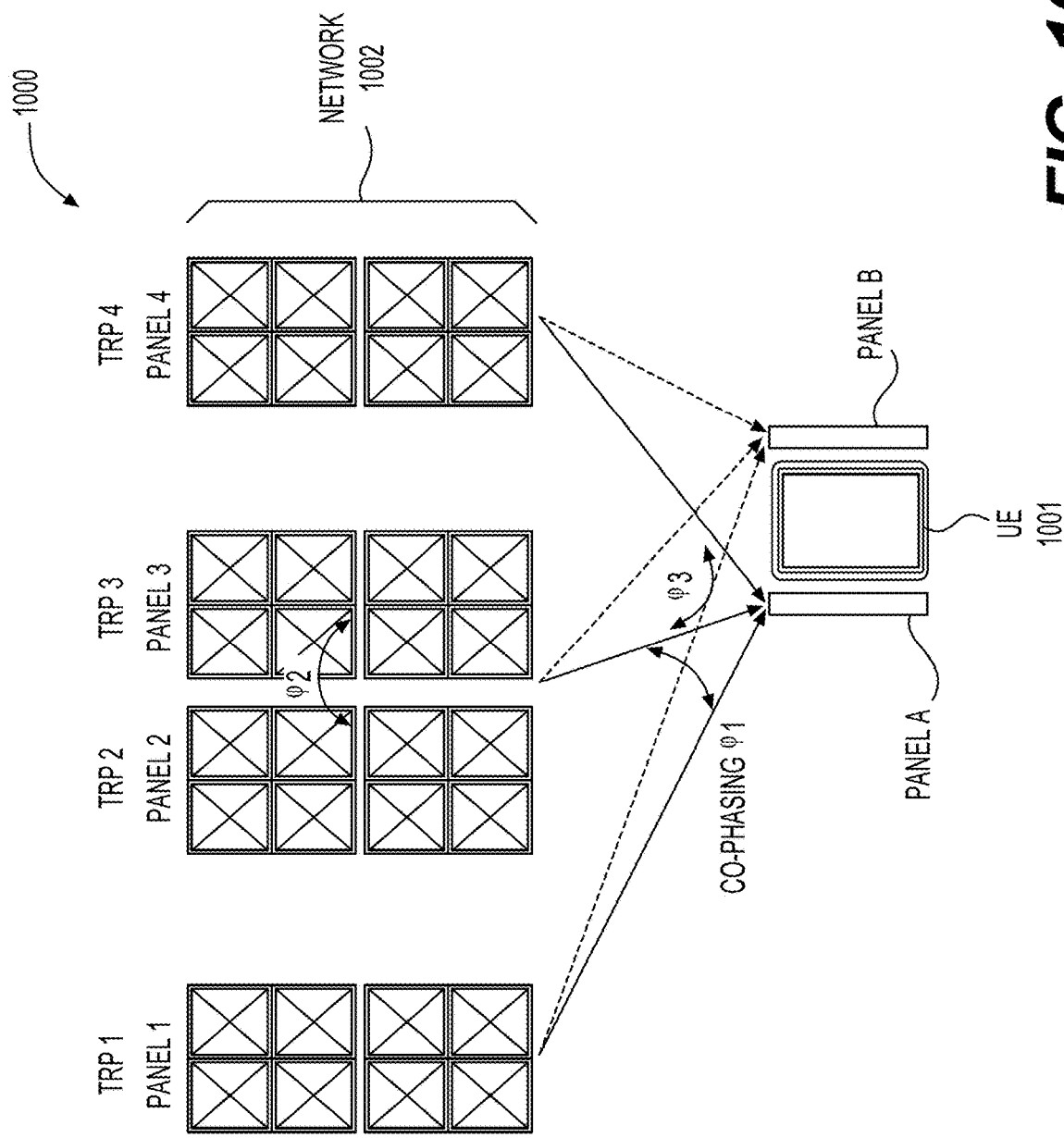
FIG. 10A shows a wireless communication system 1000 according to an embodiment of the disclosure.

FIG. 10A shows a wireless communication system 1000 according to an embodiment of the disclosure. The system 1000 can include a UE 1001 and a network 1002. At the network 1002, four TRPs (TRP1-TRP4) are deployed. Each TRP corresponds to a panel (Panel 1-Panel 4). As shown, Panel 2 and Panel 3 are close to each other, while Panel 1 and Panel 4 are each located at a distance from the location of Panel 2 and Panel 3. Those TRPs can be controlled by a same base station (e.g., a gNB) and can operate together. The UE 1001 has been equipped with two panels (Panel A and Panel B).

Due to the distributed geographic locations of the Panels 1-4, synchronized signals transmitted from the panels 1-4 to the UE 1001 can take different paths having different distances. When arriving at the UE 1001, the signals may have different phases (or phase angels) or arriving timings. Accordingly, to enable the TRPs to operate in the CJT mode, co-phasing may be applied to the TRPs at the network 1002 to compensate for the different arriving timings.

To do that, a CSI measurement and report process can be performed between the network 1002 and the UE 1001. During the process, the UE 1001 can measure a phase difference (or an arriving timing difference) for the respective panels and report to the network 1002. Based on the reported measurement results of the phase difference (co-phasing information), the network 1002 can apply a co-phasing processing to the respective panels. As an example, a co-phasing angel φ1 between Panel 1 and the location of Panels 2-3 can be determined (measured) by the UE 1001 and applied by the network 1002. Similarly, a co-phasing angel φ2 between Panels 2 and 3 and a co-phasing angel φ3 between the location of Panels 2-3 and Panel 4 can be determined and applied.

Also, in addition to co-phasing, amplitude or transmit power differences of the signals transmitted from the TRPs 1-4 can also be measured at the UE 1001 and reported the network 1002 to facilitate coherent joint transmission among the TRPs 1-4.

An exemplary CSI measurement and report process is described below. In the process, the downlink codebook report from the UE 1001 is enhanced by including the co-phasing and amplitude (power) information obtained at the UE 1001.

In some embodiments, by one or more resource configurations, a gNB (not shown) can configure to the UE 1001 multiple CSI-RS resources in a CSI-RS resource set for largely-spaced Tx Panels. For example, the multiple CSI-RS resources can be frequency division multiplexed (FDMed). The multiple CSI-RS resources can correspond to one or more channel measurement resources (CMRs) specified in a CSI report configuration. Or, the gNB can configure to the UE 1001 a multi-port resource in a CSI-RS resource set for the largely-spaced Tx panels in the one or more resource configuration. For example, the multi-port CSI-RS can be a 4-port, 8-port, 16-port, or the like. In an example, the Panels 1-4 each have 4 antenna ports. Accordingly, a 16-port CSI-RS can be configured.

The gNB can also configure a CSI report configuration to the UE 1001. For example, the CSI report configuration can be associated with the one or more resource configurations. The CSI report configuration can indicate a codebook type, such as a Type I codebook type or a Type II codebook type. For the multi-port CSI-RS, the CSI report configuration can map the CSI-RS ports to the respective panels in an example. The gNB can then triggers the UE 1001 to perform a CSI measurement and report process.

The UE 1001 can follow the CSI report configuration to perform a CSI measurement. Based on the measurement results, the UE 1001 can report co-phasing (phase angel), amplitude, or power differences among the CSI-RS resources, CSI-RS resource groups, or ports (of the multi-port CSI-RS) in the CSI-RS resource set. The CSI-RS resource set may correspond to one or more CMRs.

In some examples, each of the multiple CSI-RS resources can be a multi-port CSI-RS transmitted by a panel at the network 1002. For example, each CSI-RS resource can be a 4-port CSI-RS resource transmitted from 4 ports of the respective panel at the network.

In some examples, the gNB can group the CSI-RS resources into several CSI-RS resource groups. The CSI measurement and report can be based on the CSI-RS resource groups instead of based on the CSI-RS resources. In this way, a signaling cost can be reduced. For example, a CSI-RS resource set can include one or more CSI-RS groups. Each CSI-RS group can include one or more CSI-RS resources. The composition of the CSI-RS groups can be configured to the UE 1001 by RRC or MAC CE based on a codepoint mechanism. For example, an RRC message can specify different codepoints corresponding to different CSI-RS group compositions. A MAC CE command can provide a particular codepoint to the UE 1001 to indicate a particular CSI-RS group composition.

The UE 1001 can measure and feedback co-phasing/amplitude/power differences among the CSI-RS resources in an example. Each of the CSI-RS resources corresponds to one the TRPs 1-4. The UE 1001 can measure and feedback co-phasing/amplitude/power differences among the CSI-RS resource groups in an example. The UE 1001 can measure and feedback co-phasing/amplitude/power differences among the CSI-RS ports in an example corresponding to the case that the multi-port CSI-RS resource is configured.

In some examples, the UE-reported co-phasing/amplitude (power) difference information may differentiate the differences according to antenna polarizations. For example, two sets of antennas can be used for the measurement at the UE 1001. Each set of antennas corresponds to a different antenna polarization. Accordingly, co-phasing/amplitude (power) difference information may be reported for different antenna polarizations. In this way, the network (or the gNB) can have more detailed information as the basis for more accurately controlling TRP transmissions. Better coherent joint transmission results can be achieved.

In some examples, reporting of the co-phasing/amplitude information for compensation (inter-layer interference reduction and coherent joint transmission) can be based on existing codebook designs. For example, the downlink Type I and Type II codebooks described in 3GPP Release 16 and Release 17 standards can be reused in the CSI reporting. In some examples, the UE 1001 can feedback one PMI of a precoder including compensation of co-phasing/amplitude/power differences corresponding to respective CSI-RS resources, CSI-RS resources groups, or CSI-RS ports. The precoder corresponding to the one PMI can be from an existing codebook or can be a newly designed codebook. In some examples, the UE 1001 can feedback multiple PMIs (each corresponding to a respective CSI-RS resource, a CSI-RS resource group, respective SCI-RS ports, or a respective TRP) together with the co-phasing/amplitude/power differences among the CSI-RS resources, CSI-RS resource groups, or CSI-RS ports (when one multi-port CSI-RS resource is configured). The codebooks of the multiple PMIs can reuse the existing codebook designs.

Figure 10B:
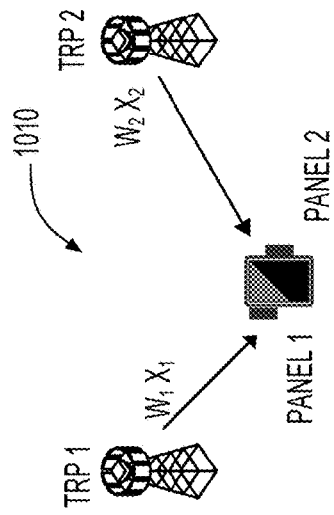
FIG. 10B shows examples of codebook structures according to embodiments of the disclosure.

FIG. 10B shows two examples (Example 1020 and Example 1030) of codebook structures used in the CSI report according to some embodiments of the disclosure. The two examples 1020 and 1230 are explained with reference to a wireless system 1010 shown in FIG. 10B. The system 1010 includes two TRPs (TRP 1 and TRP 2) and a UE having two antenna panels (Panel 1 and Panel 2). As shown, the TRP 1 and TRP 2 can perform NC-JT or C-JT based on precoders W1 and W2, respectively. W1 and W2 can each be precoders from an exsting codebook, such as a single TRP (sTRP) codebook. The sTRP codebook can be a Type I or Type II codebook or any other types of codebook in various examples.

As shown in Example 1020, the codebook structure includes two sTRP precoders (precoder matrices) W1 and W2, and a phase and amplitude compensation factor (or precoder)

$$\begin{bmatrix} a_1 \exp(j\theta_1) & 0 \\ 0 & a_2 \exp(j\theta_2) \end{bmatrix}.$$

The amplitude factors $\alpha 1$ and $\alpha 2$ are used to compensate the pathloss difference between the two TRPs. The phase factors $\theta 1$ and $\theta 2$ can be used to compensate the relative phase due to the distance difference between the two TRPs. Accordingly, a CSI report can include two PMIs corresponding to the two sTRP precoders $W_1$ and $W_2$ and a UE selected phase and amplitude compensation factor precoder. In some examples, the UE selected phase and amplitude compensation factor precoder may represented using a PMI corresponding to a codebook.

Alternatively, a codebook having the structure of $$\begin{bmatrix} a_1 \exp(j\theta_1) \times W_1 \\ a_2 \exp(j\theta_2) \times W_2 \end{bmatrix}$$

as shown in Example 1020 can be introduced. The CSI report may include a PMI of a precoder from this codebook. The precoder can include the compensation information for phase difference and/or amplitude difference between the two TRPs.

As shown in Example 1030, the codebook structure also includes two sTRP precoders (precoder matrices) W1 and W2. The W1 and W2 are shown with a different form. W1 takes a form of a combination of $W1^{(1)}$ and $W1^{(2)}$. W2 takes a form of a combination of $W2^{(1)}$ and $W2^{(2)}$. The codebook structure can further include a cross-TRP phase and amplitude compensation factor $$\begin{bmatrix} a_1 \exp(j\theta_1) & 0 \\ 0 & a_2 \exp(j\theta_2) \end{bmatrix}$$

and a cross-layer phase and amplitude compensation factor $$\begin{bmatrix} b_1 \exp(j\varphi_1) & 0 \\ 0 & b_2 \exp(j\varphi_2) \end{bmatrix}.$$

The amplitude factors $\alpha 1$ and $\alpha 2$ are used to compensate the pathloss difference between two TRPs. The amplitude factors b1 and b2 are used to adjust codebook amplitude between two layers. The phase factors $\theta 1$ and $\theta 2$ can be used to compensate the relative phase due to the distance difference between two TRPs. The phase factors $\varphi\_1$ and $\varphi\_2$ are used to adjust codebook phase between two layers.

Accordingly, in an example, the CSI report can include information of the sTRP precoders W1 and W2, the cross-TRP phase and amplitude compensation factor, and the cross-layer phase and amplitude factor. For example, PMIs of respective codebooks can be used in the CSI report to represent the respective precoders (or factors).

In some examples, instead of reporting separately of the multiple precoders, one precoder (or respective PMI) can be reported, for example, taking the form of $$\begin{bmatrix} a_1 b_1 e^{j(\theta_1+\varphi_1)} W_1^{(1)} & a_1 b_2 e^{j(\theta_1+\varphi_2)} W_1^{(2)} \\ a_2 b_1 e^{j(\theta_2+\varphi_1)} W_2^{(1)} & a_2 b_2 e^{j(\theta_2+\varphi_2)} W_2^{(2)} \end{bmatrix}.$$

Based on the principles of Examples 1020 and 1030, in some examples, the information of one or more phase differences or one or more amplitude differences among the CSI-RSs transmitted from the multiple TRPs can be a UE-selected additional precoder $W_a$. The UE-selected additional precoder $W_a$ can be one of the above phase and amplitude compensation factors in Examples 1020 and 1030. The network can construct a to-be-used precoder(s) for TRPs based on the additional $W_a$ and reported one or more PMIs. In an example, a NC-JT CSI report can include PMIs of precoders $[W_{PMI1}\ W_{PMI2}]$. The network or the TRPs can use the reported structure of $W_a[W_{PMI1}\ W_{PMI2}]$ to constructed a to-be-used precoder(s). In an example, a C-JT CSI report can include one PMI of a precoder $W_{PMI}$. The network or the TRPs can use the reported structure of $W_a W_{PMI}$ to construct a to-be-used precoder(s).

Figure 11A:
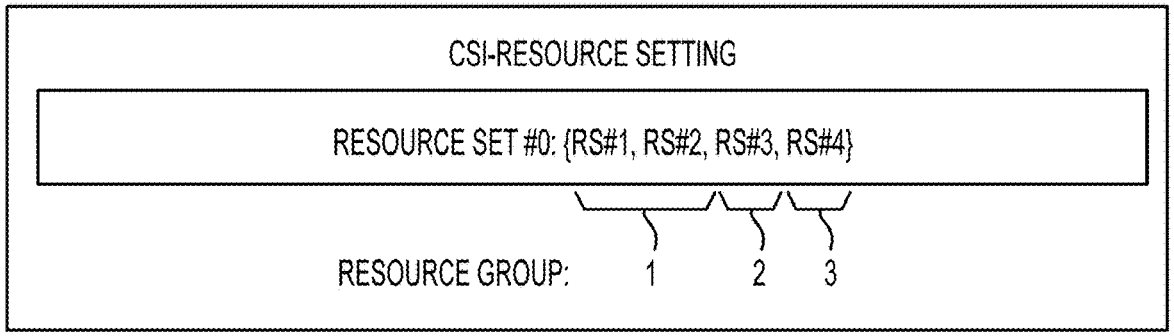
FIG. 11A and FIG. 11B show an example of a resource group configuration.
Figure 11B:
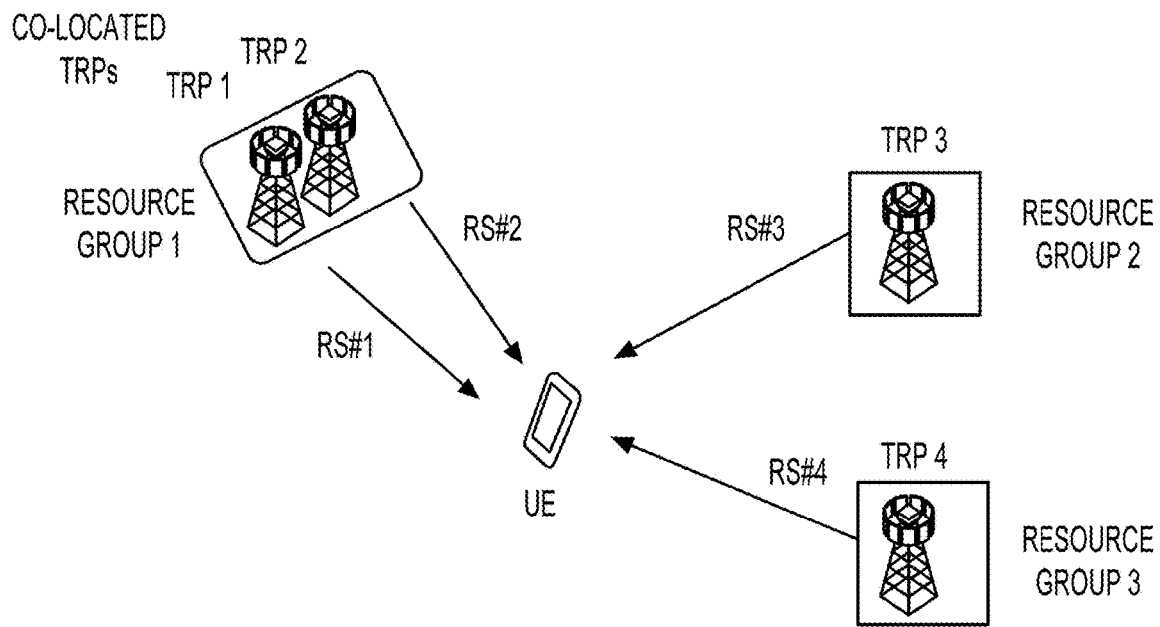

FIG. 11A and FIG. 11B show an example of a resource group configuration. In the CSI-resource setting of FIG. 11A, a resource set #0 includes 4 RS resources RS #1-RS #4. The 4 RS resources are partitioned into 3 resource groups 1-3. The first resource group includes RS #1 and RS #2. The second and third resource groups include RS #3 and RS #4, respectively.

FIG. 11B shows 4 TRPs (TRP 1-TRP 4). TRP 1 and TRP 2 are co-located with each other. Accordingly, signals from the TRP 1 and TRP 2 can be treated as quasi-co-located for the purpose of CSI reporting. TRP 3 and TRP 4 are at different distances from the location of TRP 1 and TRP2. As shown, the 4 RS resources configured in FIG. 11A are assigned to the 4 TRPs 1-4 in FIG. 11B, respectively. Particularly, RS #1 and RS #2 in the same resource group 1 are assigned to the co-located TRPs 1-2. When reporting CSI (including the co-phasing/amplitude/power differences) based on the resource groups, the TRP 1 and TRP 2 can be treated as one element. In this way, the signaling cost of the CSI report can be reduced.

2. Coherent Joint Transmission Enhancement Based on SRS

In some embodiments, another approach to obtain the co-phasing and amplitude (power) differences for CJT is employed. In this approach, the network 1002 can derive the downlink co-phasing and amplitude (power) differences based on measurements of uplink SRS transmitted from the UE 1001.

For example, the gNB can configure and trigger SRS-AS (i.e., SRS with antenna switch) for the UE 1001 in the FIG. 10A example. The gNB can measure the channel between the UE 1001 and the TRPs 1-4 in FIG. 10A based on the SRS-AS. Based on the measurements, the gNB can determine the co-phasing and/or amplitude/power differences among the Panels 1-4 or TRPs 1-4 in FIG. 10A for downlink transmission.

In some examples, considering the UE-side antenna polarizations and panels may affect the measurement results of co-phasing/amplitude/power differences information, the gNB can configure how the SRS-AS is transmitted at the UE 1001 regarding which panels and polarizations are involved. For example, the gNB can request that the SRS-AS be transmitted by UE antenna ports of different panels with a same polarization (or different polarizations) at the same time. In an example, for a scenario of 2T4R SRS-AS, the gNB can configure that the two transmissions (2T) from two active antenna ports are conducted by two antenna ports belonging to different panels with a same polarization (or different polarizations). "2T4R" indicates a capability of the UE 1001 that the UE 1001 is configured with 4 antenna ports but only 2 antenna ports can be simultaneously used for downlink reception.

In some examples, a common UE supports a smaller UL ports and larger DL ports, such as two UL ports and four DL ports. The UL ports and the DL ports share a set of antennas. For UL, a gNB configures and triggers a UE to transmit two-port SRS for UL channel estimation and precoding. For DL, the gNB may need full channel information from the four UE antennas. SRS-AS can be used for DL channel estimation, precoding, and transmission. For example, the gNB can configure one or multiple SRS resources (on different OFDM symbols) in an SRS set, and configure and trigger the UE to transmit SRS using the four UE antennas. If the UE supports 2T4R, the gNB should configure two SRS resources (on different OFDM symbols) in an SRS set; and the UE can transmit two-port SRS from the first two UE antennas on the first SRS resource and then transmit two-port SRS from the last two UE antennas on the second SRS resource.

3. Cell Selection Mechanism with Multiple TRPs

Figure 12:
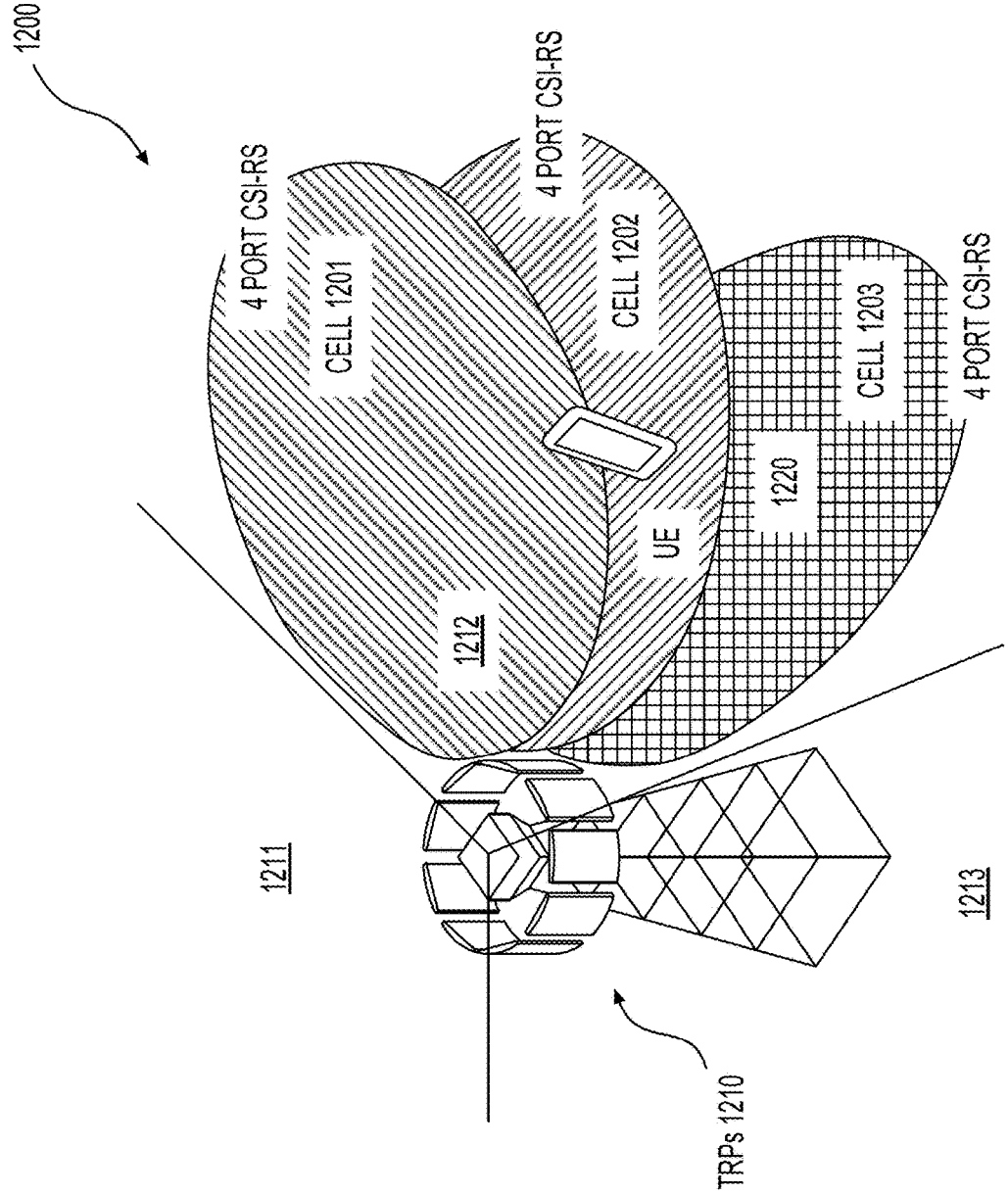
FIG. 12 shows a scenario 1200 of downlink transmission from multiple transmission/reception points (TRPs).

FIG. 12 shows a scenario 1200 of downlink transmission from multiple TRPs. As shown, a network can employ multiple TRPs 1210 to cover a serving region. The serving region is partitioned into three sectors 1211-1213. Each sector is covered by multiple TRPs. In the sector 1212, 3 TRPs are employed to form 3 cells 1201-1203 (microcells). A UE 1220 positioned in the sector 1212 can receive signals from 3 cells 1201-1203. Based on measurement or other factors, the UE 1220 or the network may determine not all of the three cells are needed for the UE 1220 to obtain the service from the network. The UE 1220 or the network may select a subset of TRPs to provide the service. For example, the cells 1201 and 1202 may be selected by the UE 1220 based on CSI-RS measurement and signaled to the network.

An exemplary cell selection mechanism is described below.

In a first stage, a gNB can perform a radio resource management (RRM)/beam management process to obtain L1-RSRP/L1-SINR/L3-RSRP/L3-RSRQ of signals from a set of candidate cells. Or, the gNB can configure or trigger an SRS-AS transmission process to obtain detailed CSI information (without CQI information) of TRP combinations of the set of candidate cells for a UE. Based on the measurement results, the gNB can then select TRP combinations. In a second stage, the gNB can configure reference signal resources and trigger CSI measurements and feedbacks based on the selected TRP combinations. The gNB can further use the second round CSI feedbacks of the selected TRP combinations to down-select from the previously selected TRP combinations.

When the gNB configures SRS-AS resources for the selection of TRP combinations in the first stage, the process can be relatively transparent to a UE.

In some examples, the gNB uses RRM/beam management in the first stage. In the second stage, based on the TRPs selected in the first stage (selected TRP combination), the gNB may select multiple TRP combinations to configure and trigger a large number of CSI measurements and feedbacks to find out the best TRP combination for a UE. This can increase the feedback overhead. For example, in the FIG. 12 examples, assuming the sector 1212 is covered by 5 micro cells corresponding to 5 TRPs. After the first stage of beam management operation, three cells 1201-1203 are selected from the 5 micro cells. In the second stage, a subset of cells are to be selected from the cells 1201-1203. For this purpose, the gNB may configure different TRP combinations for the second-stage measurement. For example, the TRP combinations can be {1201, 1202}, {1201, 1203}, {1203, 1202}, or {1201, 1202, 1203}, where the cell labels are used to represent the respective TRPs.

In some embodiments, for feedback overhead reduction, the gNB can configure multiple CSI-RS resources in a CSI-RS resource set. Or, the gNB can configure one 4-port, 8-port, or X-port CSI-RS resource in a CSI-RS resource set. The gNB can configure and trigger a CSI measurement and feedback process. During the process, for example, each of the multiple CSI-RS resources can be transmitted by a respective TRP. For the one 4-port/8-port/X-port CSI-RS resource in a CSI-RS resource set, the gNB can use an RRC configuration or MAC CE to map CSI-RS ports to respective TRPs.

Based on the resource configurations, the gNB can configure measurement combinations of the multiple CSI-RS resources or CSI-RS resource ports. These measurement combinations correspond to the TRP combinations (in the second stage) described above. The gNB can configure and indicate measurement combinations by RRC/MAC CE (RRC and/or MAC CE) codepoint ways. For example, the field "SRS resource indicator" and "SRS request" of DCI format 0_1 or "Transmission configuration indication" and "SRS request" of DCI format 1_1 can be used for the indication.

A UE can feedback a CSI report for the preferred TRP, panel, or port combinations with one or multiple bitmaps or indicators (combination indexes) to indicate the compositions of the preferred panels/antenna group combinations. The preferred TRPs or ports can be included in the CSI report in form of a bitmap or a combination index in some examples. A bitmap can indicate which TRPs or CSI-RSs are selected or not selected among a candidate set. The combination index can be configured by RRC or MAC CE from a gNB to indicate a combination of TRPs, or CSI-RSs (corresponding to CSI-RS resources in a resource set or CSI-RS ports of a CSI-RS resource). For example, the combination index can correspond to an entry of a table configured by RRC and/or MAC CE. Each entry may indicate a set of TRPs or CSI-RSs. It is noted that the method of reporting a bitmap or a combination index is different from the method of reporting a set of CRIs. For example, a combination index is used as an indicator of a group of one or more CSI-RS resources or CSI-RS ports based on a configured table. A CRI can be an indicator or an index of a CSI-RS resource. Accordingly, a combination index, when reported, can correspond to a set of CRIs.

In an approach of gNB initiative, the gNB can indicate multiple measurement combinations of the multiple CSI-RS resources or CSI-RS resource ports. The gNB can indicate the feedback CSI number, e.g. one CSI for one of the measurement combinations with two CMRs and two CSIs for two of the measurement combinations with one CMR for a CSI report.

In an approach of UE initiative, the UE can feedback a CSI report for one or more preferred TRP combinations with multiple bitmaps/indicators to indicate the composition of the preferred TRP combinations.

In an example of the UE initiative, the UE can feedback a CSI report for preferred TRP combinations with one or multiple bitmaps/indicators. For example, the TRP combinations can be indicated using a TRP selection matrix W0 or multiple CRIs. The indication can be based on a measurement capability of the UE. For example, one CSI measurement can be provided for one of the measurement combinations with two CMRs, and two CSI measurements can be provided for two of the measurement combinations with one CMR.

In an embodiment, for MU-MIMO, the UE may use a predefined precoder or UE-selected precoder for unused/unpreferred TRP combinations to estimate a CSI report and may feedback the UE-selected precoder. Based on such a CSI report, the gNB can know a degree of interference if signals are transmitted from the un-preferred TRP combinations. Based on this knowledge, the gNB can avoid transmitting signals towards the reporting UE to reduce interference to the reporting UE.

An example of CSI-RS ports-based CSI report for TRP selection is described below. A CSI report configuration can be received at a UE from a base station. The CSI report configuration indicates a CSI-RS resource configured for transmitting CSI-RS from multiple TRPs. The CSI-RS resource includes multiple ports (or CSI-RS ports). The CSI report configuration indicates a report quantity to request the UE to report CSI information of preferred ports corresponding to ones of the TRPs. The preferred ports corresponds to preferred TRPs selected from the multiple TRPs by the UE or the base station. A CSI-RS measurement can be performed at the UE based on the CSI-RS transmitted from the multiple TRPs using the CSI-RS resource indicated by the CSI report configuration. The UE can transmit to the base station a CSI report based on the CSI report configuration. The CSI report indicates (i) the preferred ports corresponding to the preferred TRPs selected from the multiple TRPs by the UE or the base station and (ii) the CSI information associated with the preferred TRPs.

Iii. Examples of CSI Acquisition and Cell Selection Mechanisms for Distributed Trp Downlink Transmission

Example 1: Co-Phasing and Amplitude Differences Report Based on Multiple CSI-RS Resources Taking the system 1000 in FIG. 10A as an example, a gNB of the network 1002 configures multiple CSI-RS resources in a CSI-RS resource set to be one or more channel measurement resources (CMRs). The gNB configures a CSI report configuration to the UE 1001. The CSI report configuration is associated with the multiple CSI-RS resources. The CSI report configuration may specify a codebook type. The gNB triggers CSI measurement and feedback at the UE 1001. The multiple CSI-RS resources are transmitted in an FDM manner and at the same time resources. The UE follows the CSI report configuration to perform CSI measurement and feedback with co-phasing and/or amplitude (power) differences among the CSI-RS resources in the CSI-RS resource set.

In some examples, each of the multiple CSI-RS resources can be transmitted by a respected one of the TRPs in FIG. 10A. In some examples, the gNB can group the CSI-RS resources into several CSI-RS resource groups. For example, a CSI-RS resource set includes at least one CSI-RS group, and each CSI-RS group includes at least one CSI-RS resource. The structure of the CSI-RS groups can be configured by RRC or MAC CE. The gNB can further select the measurement targets from the multiple CSI-RS resources by a DCI with a selection field. The selection field can be an index of a CSI-RS resource combination table configured by way of RRC/MAC CE (RRC and/or MAC CE) codepoint. Such a mechanism is similar to that of "SRS resource indicator" and "SRS request" of DCI format 0_1 and "Transmission configuration indication" and "SRS request" of DCI format 1_1.

The UE 1001 can measure and feedback co-phasing and/or amplitude (power) differences among the CSI-RS resources or CSI-RS resource groups. The UE 1001 may further differentiate the differences into different antenna polarizations in a CSI report. For example, for each of two polarizations at the UE 1001, a set of co-phasing and/or amplitude (power) differences are reported.

For example, a co-phasing difference between two TRP panels can be a phase difference transformed from the transmission timing difference between the two TRP panels. For example, a co-phasing difference between two TRP panels of the gNB with respect to a panel of the UE 1001 can be a phase difference transformed from the arrival timing difference between the two panels of the gNB with respect to the panel of the UE 1001.

The codebook type may reuse existing DL Type I and Type II codebooks. The UE 1001 may feedback co-phasing and/or amplitude (power) differences among the CSI-RS resources or CSI-RS resource groups for inter-layer interference reduction or coherent joint transmission. For example, the UE 1001 may feedback a PMI, the precoder matrix of which has considered the co-phasing and/or amplitude (power) differences among the CSI-RS resources or CSI-RS resources groups. Or, the UE 1001 can feedback multiple PMIs for individual respective CSI-RS resources or CSI-RS resources groups together with the feedback of co-phasing and/or amplitude (power) differences among the CSI-RS resources or CSI-RS resource groups.

In an example, if the gNB configures a coherent joint transmission (C-JT) CSI report, the UE 1001 can feedback a PMI including co-phasing and/or amplitude (power) differences among the CSI-RS resources or CSI-RS resources groups (the precoder matrix of the PMI has considered the co-phasing and/or amplitude (power) differences).

In an example, if the gNB configures a non-coherent-joint transmission (NC-JT) CSI report, the UE can feedback multiple PMIs for individual CSI-RS resources or CSI-RS resources groups and co-phasing and/or amplitude (power) differences among the CSI-RS resources or CSI-RS resource groups.

In an example, if the gNB configures multiple combinations or pairs of CSI-RS resources in the CSI-RS resource set, the UE 1001 can feedback multiple PMIs for respective individual CSI-RS resources and co-phasing and/or amplitude (power) differences among the respective CSI-RS resources. The combinations or pairs can comprise at least two CSI-RS resources selected from different CSI-RS groups.

Figure 13:
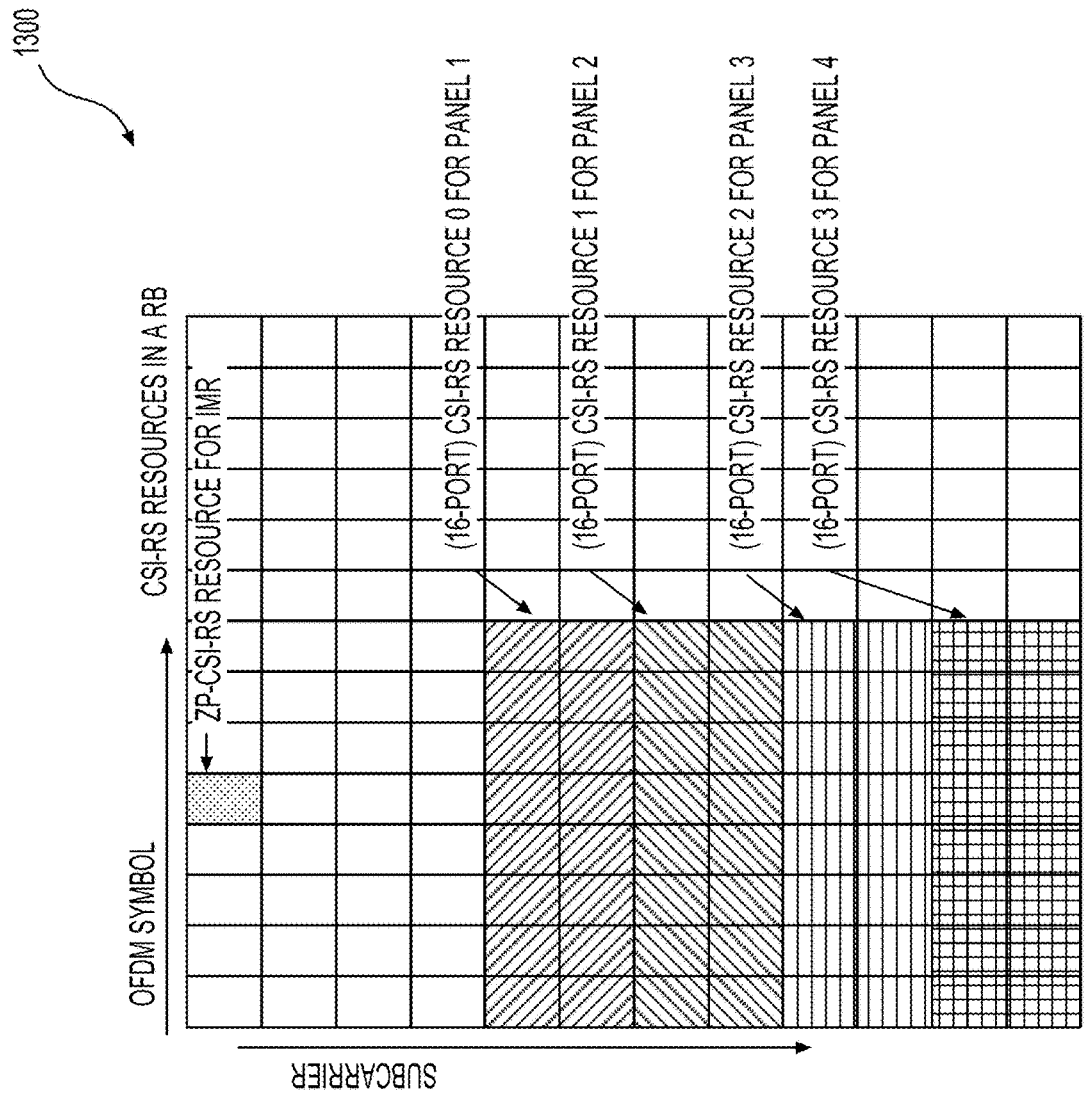
FIG. 13 shows an example of CSI-RS resource configuration 1300.

FIG. 13 shows an example of CSI-RS resource configuration 1300. The CSI-RS resource configuration 1300 is shown over a time-frequency resource grid. With reference to the FIG. 10A example, each of the four panels (Panels 1-4) has 16 antenna ports. The network 1002 (the gNB) can configure 4 FDMed CSI-RS resources in a CSI-RS resource set. As shown, a first set of 16 resource elements on the grid are used for 16-port CSI-RS resource 0; a second set of 16 resource elements on the grid are used for 16-port CSI-RS resource 1; a third set of 16 resource elements on the grid are used for 16-port CSI-RS resource 2; and a 4th set of 16 resource elements on the grid are used for 16-port CSI-RS resource 3. The CSI-RS resources 0-1 in FIG. 13 correspond to Panels 1-4 in the FIG. 1 example.

In an example, the network 1002 configures a CSI report configuration to the UE 1001 with DL codebook Type I. The network 1002 triggers CSI measurement and feedback for the UE 1001. Each CSI-RS resource could include the 16 antenna ports. The UE follows the CSI report configuration to perform CSI measurement and feedback with co-phasing and/or amplitude (power) differences among the CSI-RS resources in the CSI-RS resource set. If the gNB configures the CSI report configuration with NC-JT, the UE 1001 can feedback four PMIs for the four panels and four or three co-phasing and/or amplitude (power) differences among the four panels for interference reduction. For example, the co-phasing and/or amplitude (power) differences are with respect to a same TRP panel (e.g., Panel 1) or a same reference basis. If the gNB configures the CSI report configuration with C-JT, the UE can feedback one PMI for the four panels and four or three co-phasing and/or amplitude (power) differences among the four panels for inter-layer interference reduction or coherent joint transmission.

Example 2: Co-Phasing and Amplitude Differences Report Based on CSI-RS Ports of a Multi-Port CSI-RS Resource With reference to the FIG. 10A example, a gNB of the network 1002 configures one 4-port/8-port/X-port CSI-RS resource in a CSI-RS resource set to be at least one CMR. The gNB configures a CSI report configuration with a codebook type. The gNB triggers CSI measurement and feedback for the UE 1001. For the one 4-port/8-port/X-port CSI-RS resource in the CSI-RS resource set, the gNB can use RRC/MAC CE (RRC and/or MAC CE) configuration to map CSI-RS ports to ports of Panels 1-4 in FIG. 10A. The UE 1001 follows the CSI report configuration to do CSI measurement and feedback with co-phasing and/or amplitude (power) differences among the CSI-RS ports in the CSI-RS resource set for the at least one CMR.

For example, the multiple CSI-RS ports can be transmitted by ports of the respective panel, respectively. In an example, the gNB can group the CSI-RS resources (corresponding to the CSI-RS ports) into several CSI-RS resource groups for the measurement of the co-phasing/amplitude (power) differences. For example, a CSI-RS resource set includes at least one CSI-RS group (CSI-RS port group) and each CSI-RS group (CSI-RS port group) includes at least one CSI-RS port of resource (a single-port resource). The composition of the at least one CSI-RS group can be configured by RRC or MAC CE.

The UE can measure and feedback co-phasing and/or amplitude (power) differences among the CSI-RS ports of resources or CSI-RS resource groups (CSI-RS port groups) and may further differentiate the differences into different antenna polarizations.

The UE 1001 may reuse existing codebook types, such as the downlink Type I and Type II codebooks. The UE can feedback co-phasing and/or amplitude (power) differences among the CSI-RS resources (CSI-RS ports) or CSI-RS resource groups (CSI-RS port groups) for inter-layer interference reduction or coherent joint transmission. For example, the UE 1001 may feedback a PMI including co-phasing and/or amplitude (power) differences among the CSI-RS resources or CSI-RS resource groups. Or, the UE 1001 may feedback multiple PMIs for CSI-RS resources (CSI-RS ports) corresponding to the multiple TRP panels, respectively. Or, the UE 1001 may feedback multiple PMIs for CSI-RS resources groups (CSI-RS port groups) and co-phasing and/or amplitude (power) differences among the CSI-RS resources (corresponding to respective TRP panels) or CSI-RS resource groups.

Example 3: Co-Phasing and Amplitude Differences Acquisition Based on Uplink SRS Resource With reference to the FIG. 10A example, a gNB of the network 1002 can configure and trigger SRS-AS for a UE. The gNB can then measure the uplink channel, the co-phasing differences, and/or amplitude (power) differences among the TRPs (TRP 1-TRP 4). UE-side antenna polarizations and panels may cause (or affect) co-phasing/amplitude (power) differences. Considering this effect, the gNB can configure SRS-AS with a request that the SRS-AS can be transmitted by antenna ports of different panels with the same polarization or different polarizations. The request can be included in the RRC or MAC CE for the configuration of SRS.

In a first example, the UE 1001 served by the gNB has two panels. Each panel has two antenna ports with different polarizations. The UE 1001 can have a transmission capability of 2T4R. The gNB can configure 2T4R SRS-AS with a request to the UE 1001. Based on the request, the UE 1001 can transmit a first 2T (two-port) SRS by the two ports of the two panels having the first polarization; and transmit the second 2T (two-port) SRS by the other two ports of the two panels having the second polarization.

In a second example, the UE 1001 served by the gNB has three panels. Each panel has two antenna ports with different polarizations. The gNB can configure 3T6R SRS-AS with an indication to request the UE to transmit the first 3T (three-port) SRS by the three first-polarization antennas of the three panels and transmit the second 3T (three-port) SRS by the three second-polarization antennas of the three panels.

Figure 14:
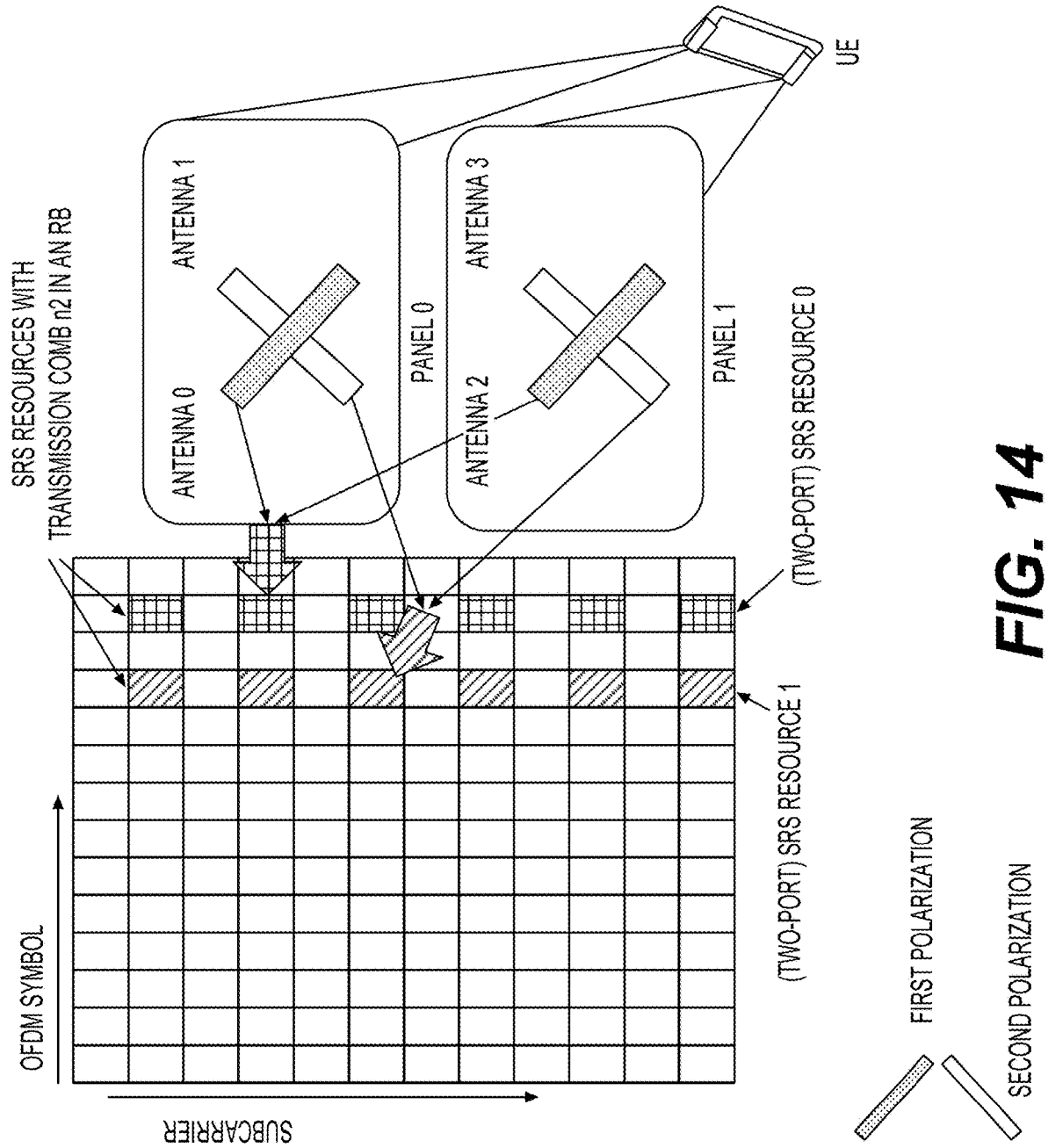
FIG. 14 shows an example of transmitting SRS with antenna ports having different polarizations.

FIG. 14 shows an example of transmitting SRS with antenna ports having different polarizations. FIG. 14 shows two SRS resources in a resource block (RB) with a transmission density of comb n2 (one frequency domain resource for every two subcarriers). The two SRS resources include two-port SRS resource 0 and two-port SRS resource 1. FIG. 14 also shows two UE panels, Panel 0 and Panel 1. Panel 0 includes two cross-polarized antennas: Antenna 0 and Antenna 1. Panel 1 includes two cross-polarized antennas: Antenna 2 and Antenna 3. Antenna 0 and Antenna 2 can use SRS resource 0 to transmit first 2 ports of SRS. Antenna 1 and Antenna 3 can use SRS resource 1 to transmit second 2 ports of SRS. Thus, the measurement of the co-phasing and/or amplitude (power) differences can be performed based on a 2T4R SRS-AS.

Example 4: TRP Selection Mechanisms

With reference to the FIG. 10A example, for selection from multiple TRPs (multiple panels, antenna groups, or micro cells), a gNB of the network 1002 can use RRM or beam management to get L1-RSRPs, L1-SINRs, L3-RSRPs, or L3-RSRQs of the TRPs from a UE 1001. The gNB can then select combinations of TRPs to configure and trigger CSI measurements and feedbacks from the UE 1001. The gNB can further use the CSI feedbacks of the combinations to select a combination of TRPs for resource allocation.

Moreover, the gNB may configure multiple CSI-RS resources in a CSI-RS resource set. The gNB may further configure a CSI report configuration associated with the CSI-RS resource set for the UE 1001. The CSI report configuration includes a report quantity to request the UE to report preferred CRIs (CSI-RS Resource Indicator). The preferred CRIs indicate multiple CSI-RS resources corresponding to UE-selected TRPs for mTRP C-JT or NC-JT transmission. For the selected CSI-RS resources (or the selected TRPs), the UE 1001 can feedback the corresponding RSRPs or suitable RI, PMI, or CQI.

In some examples, some mechanisms can be employed for CSI feedback overhead reduction. For example, the gNB can configure multiple CSI-RS resources or one 4-port/8-port/X-port CSI-RS resource in a CSI-RS resource set. The gNB can trigger CSI measurements and feedbacks based on a set of candidate TRPs. The multiple CSI-RS resources can be transmitted by respective TRPs of the candidate TRPs. In a first mechanism, the gNB can configure and indicate the measurement combinations of TRPs or CSI-RS resources by way of the RRC/MAC CE codepoint. The way of RRC/MAC CE codepoint is similar to that of "SRS resource indicator" and "SRS request" of DCI format 0_1 and "Transmission configuration indication" and "SRS request" of DCI format 1_1. In a second mechanism, the UE 1001 can select the preferred combinations with at least one bitmap or indicator to indicate the composition of the preferred combinations and feedback a CSI report.

In some embodiments, for an application scenario of MU-MIMO, the UE 1001 may use a predefined precoder or UE-selected precoder for unused/un-preferred TRP combinations in a CSI report. The UE-selected precoder provides an estimate of a CSI. Based on the UE-selected precoder for the un-preferred TRP combination, the network 1002 can avoid transmission from the un-preferred TRP in the directions indicated by the UE-selected precoder.

Figure 15A:
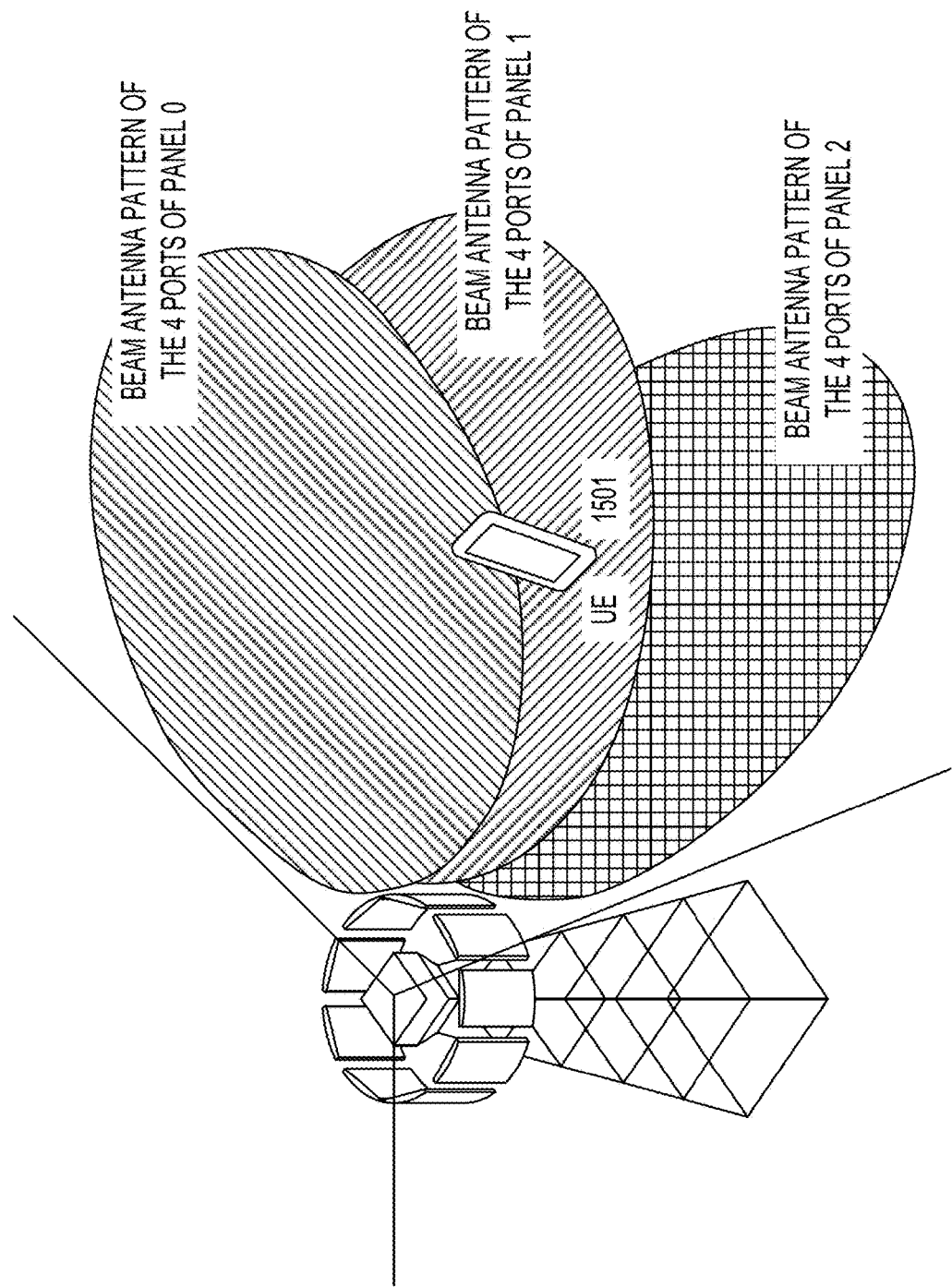
FIGS. 15A-15B show an example of CSI-RS resource configuration and TRP selection.
Figure 15B:
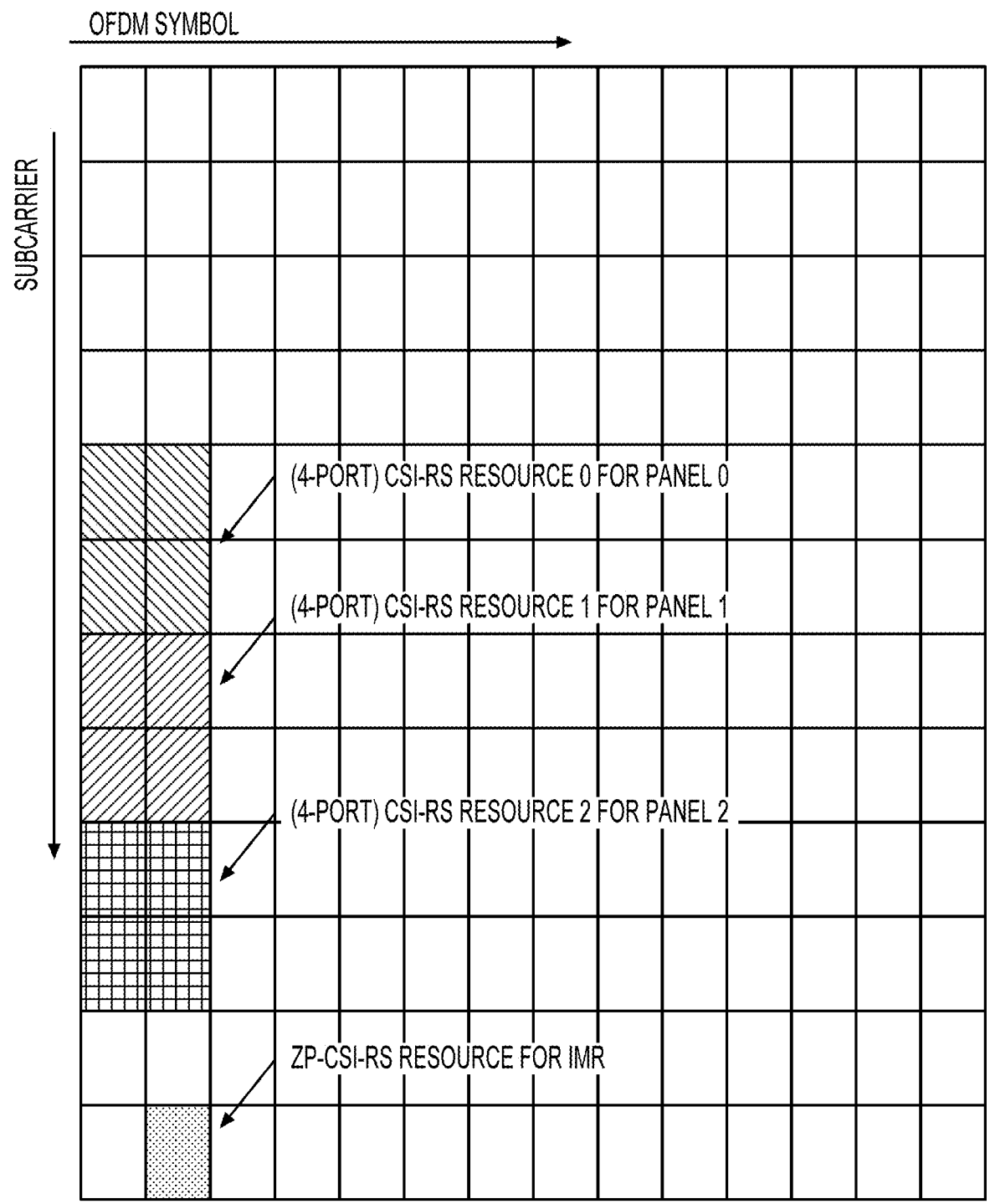

FIGS. 15A-15B show an example of CSI-RS resource configuration and TRP selection. FIG. 15A shows a UE 1501 and a network (a gNB) having three panels (Panels 0-2). Each panel has 4 antenna ports. The UE 1501 is within the coverage of beams of the three panels. The gNB can configure three FDMed CSI-RS resources in a CSI-RS resource set to the UE 1501. The three FDMed CSI-RS resources can correspond to the three panels (Panels 0-2), respectively. The three FDMed CSI-RS resources can correspond to one or more CMRs. FIG. 15B shows the 3 FDMed CSI-RS resources: 4-port CSI-RS resource 0 for Panel 0, 4-port CSI-RS resource 1 for Panel 1, and 4-port CSI-RS resource 2 for Panel 2. FIG. 15B also shows a ZP-CSI-RS resource for an interference measurement resource (IMR).

The gNB further configures a CSI report configuration with downlink codebook Type I or Type II to the UE 1501. The CSI report configuration can be associated with the CSI-RS resources shown in FIG. 15B. The gNB triggers CSI measurement and feedback for the UE 1501. Each CSI-RS resource can include resources for 4 antenna ports. In a first approach, the UE 1501 can select the preferred combinations of TRPs with at least one bitmap or indicator to indicate the panel composition of the preferred combinations in a feedback. Or, in a second approach, the gNB can select the preferred combinations of TRPs with at least one bitmap or indicator in the CSI report configuration. Accordingly, the UE 1501 can feedback a CSI according to the gNB-selected combinations of TRPs.

In an example, the gNB selects CSI-RS resource 0 to be a first CMR and selects CSI-RS resource 0 and 1 to be a second CMR in the CSI report configuration. The UE 1501 can feedback two sets of measurement results: (i) RI/(4-port)PMI/CQI results of the first CMR with an IMR measurement and (ii) RI/(8-port)PMI/CQI results of the second CMR with another IMR measurement.

In an example, the gNB selects CSI-RS resource 0 to be a first CMR, selects CSI-RS resource 0 and 1 to be a second CMR, and selects CSI-RS resource 1 and 2 to be a third CMR in the CSI report configuration. Effectively, each CMR corresponds to a combination of TRPs.

The gNB may indicate, for the three CMRs, how many sets of measurement results are to be reported by the UE 1501. For example, the UE 1501 can feedback the RI/PMI/CQI results of one or two preferred CMRs with one or two bitmaps in the CSI report if the gNB configures the UE 1501 to feedback two sets of UE-preferred CSI results. The bitmaps can correspond to the preferred CMRs, respectively.

Example 5: Dynamic TRP Selection with TRP Selection Matrix $W_0$

Figure 16:
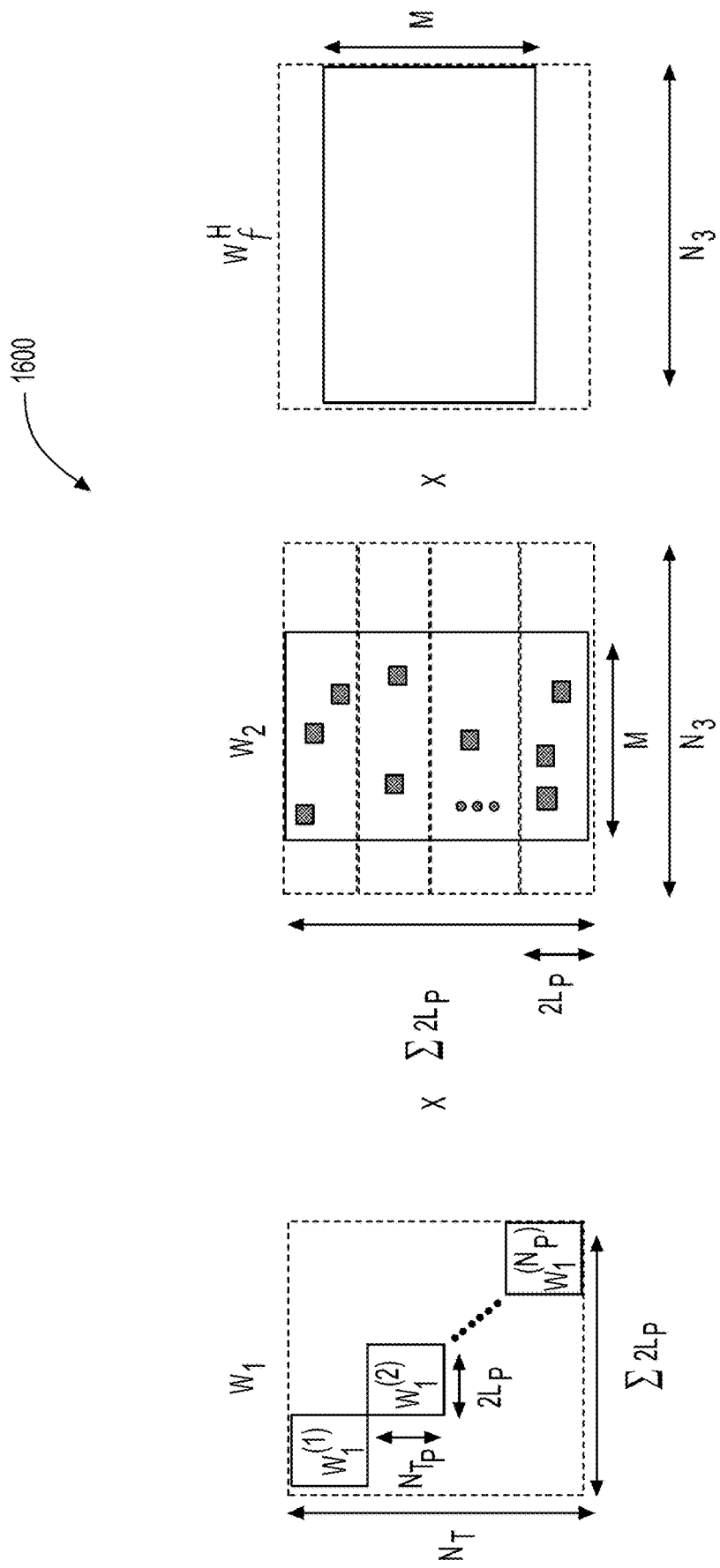
FIG. 16 shows a Type II codebook structure 1600 used for CSI feedback in multiple TRP coherent joint transmission (mTRP CJT).

In some embodiments, a Type II codebook structure 1600 shown in FIG. 16 is used for CSI feedback in multiple TRP coherent joint transmission (mTRP CJT). The structure 1600 can be based on a 3GPP Release 16 eType II precoder structure. In some examples, the 3GPP Release 16 eType II precoder can be used for multiple TRP non-coherent joint transmission (mTRP NCJT). In mTRP NCJT, multiple layers are transmitted by multiple TRPs, respectively. A 3GPP Release 16 eType II precoder per layer can be written as $$W' = W'_1 W'_2 W'^H_f,$$

where $W'_1$ represents the wideband spatial domain (SD) basis vectors, $W'_2$ represents the frequency domain (FD) compressed coefficients linearly combining the SD basis vectors to form transmission layers, and $W'_f$ (representing $W'^H_f$) represents the DFT vectors used for FD compression.

Similarly, in the Type II codebook structure 1600, a precoder can be written as $$W = W_1 W_2 W^H_f,$$

where $W_1$ represents the wideband spatial domain (SD) basis vectors, $W_2$ represents the frequency domain (FD) compressed coefficients linearly combining the SD basis vectors to form transmission layers, and $W_f$ (representing $W^H_f$) represents the DFT vectors used for FD compression. The matrix $W_1$, $W_2$, and $W_f$ can have different structures and elements than $W'_1$, $W'_2$, and $W'_f$ to be suitable for the case of mTRP CJT.

For example, the matrix W1 can have Np submatrices $W1_1^{(p)}$ corresponding to Np TRPs, respectively. In an example, $W1_1^{(p)}$ can take the form of $$W_1^{(p)} = \begin{bmatrix} v_1 & \cdots & v_{L_p} & & & \\ & & & v_1 & \cdots & v_{L_p} \end{bmatrix} \in \mathbb{C}^{N_{T_p} \times 2L_p}$$

where $v_1, \ldots v_{L_p}$ denoting $L_p$ polarization common spatial domain DFT beams for the p-th TRP, and $N_{T_p}$ denoting the number of transmit antenna ports in the p-th TRP.

For example, in Release 16 eType II codebook, W'$_2$ consists of linear combination coefficients which are reported to the gNB in the form of a single strongest coefficient in a particular polarization, reference amplitude for the other polarization, polarization specific differential amplitudes, and phase coefficients. In mTRP CJT, a particular UE can be located near or far from the coordinating TRPs. To encounter the performance loss caused by this issue, individual TRP precoder coefficients can be scaled. Thus, the reference amplitudes and differential amplitudes can be TRP specific.

For frequency domain compression, a single set of DFT vectors similar to what is in W'$_f$ as in Release 16 can be used. In some examples, considering the phase jumps across TRPs due to their geographical separation, the FD compression can be TRP specific.

Figure 17:
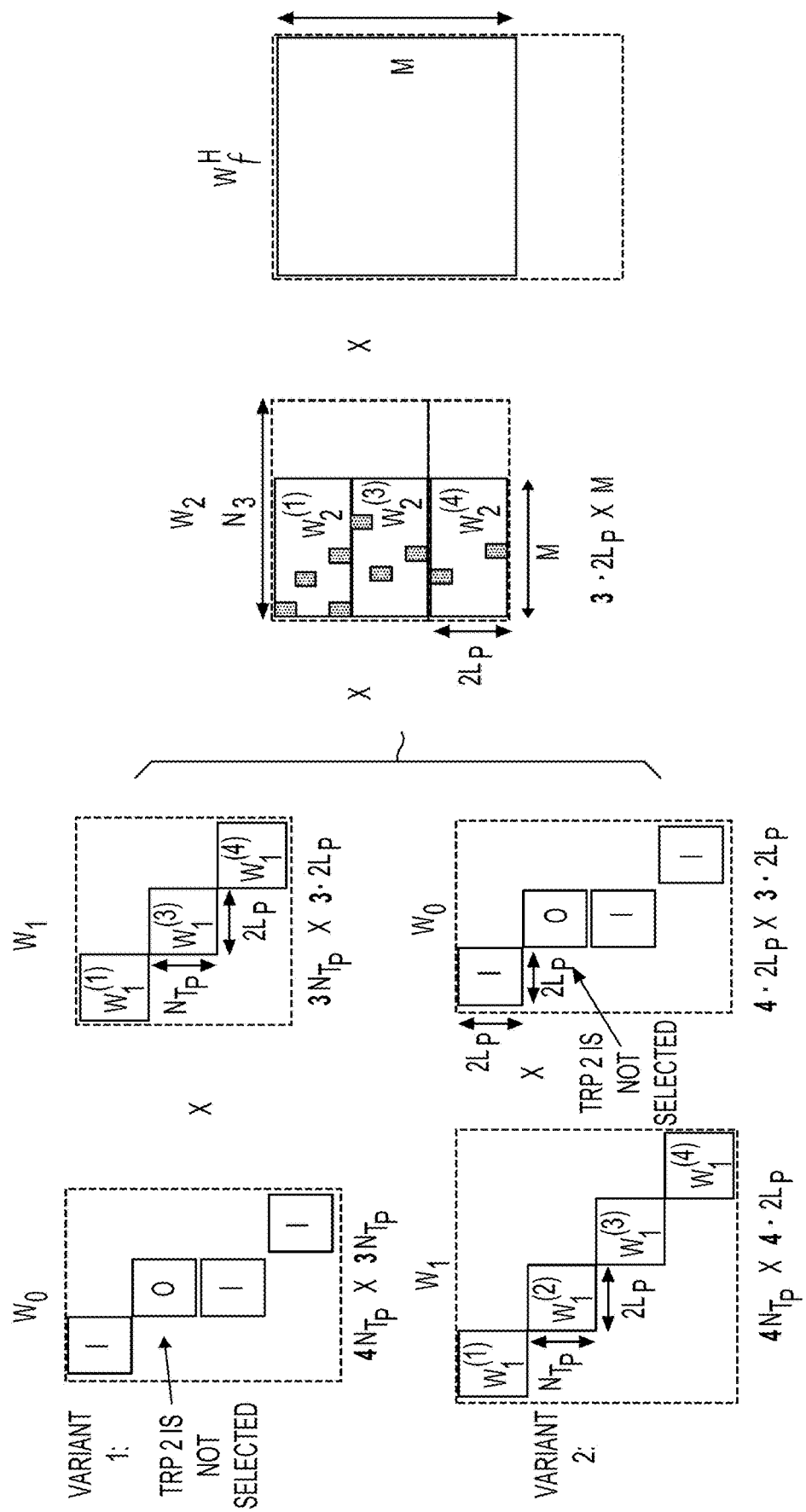
FIG. 17 shows two types (two variants) of codebook structures for CSI feedback.

Based on the Type II codebook structure 1600, in some embodiments, a TRP selection matrix W$_0$ is introduced for CSI feedback from a UE to a network. FIG. 17 shows two types (two variants) of codebook structures for CSI feedback. The two types of codebook structures are based on the Type II codebook structure 1600 and the TRP selection matrix W$_0$. The two types of codebook structure can take the following forms:

$$W = W_0 W_1 W_2 W_f^H; \quad \text{Variant 1}$$

$$W = W_1 W_0 W_2 W_f^H. \quad \text{Variant 2}$$

The examples shown in FIG. 17 correspond to a scenario where there are 4 candidate TRPs at the network side and each TRP has N$_{Tp}$ antenna ports. In a CSI report process, the UE can measure CSI-RS from the 4 TRPs. Based on the measurement results, the UE can provide a CSI report to the network. The CSI report can indicate the selected TRPs and the associated precoder. For example, the CSI report can include information about the matrices W$_0$, W$_1$, W$_2$, and/or W$_f$ shown in FIG. 17.

W$_0$ is a TRP/ports/beam selection matrix. W$_0$ can be used to dynamically report the CSI for specific TRPs/ports. As shown in FIG. 17, the TRP selection matrix can include multiple submatrices. Each submatrix has a size of N$_{Tp}$ by N$_{Tp}$. Each submatrix corresponds to one of the 4 candidate TRPs, respectively. For a TRP not selected (e.g., the second one of the 4 TRPs), the corresponding submatrix can be a zero matrix (each element being zero). For a TRP being selected, (e.g., the first, third, or fourth TRP), the corresponding submatrix can be an identity matrix.

In an example, when the network uses RRS signaling to configure a UE to report the TRP matrix W$_0$, the UE can report a TRP selection indicator i$_0$ to represent the TRP selection matrix W$_0$. For example, the TRP selection indicator i$_0$ can have an integer value in arrange of $$\left\{0, 1, 2, \ldots, \binom{N_p}{N'_p}\right\},$$

where N$_p$ is the number of candidate TRPs or TRPs configured by the network, N'$_p$ is the number of serving TRPs selected by the UE, and $$\binom{N_p}{N'_p}$$

is the total number of possibilities of different W$_0$ given N$_p$ and N'$_p$ (the combinations of selecting N'$_p$ TRPs from N$_p$ candidate TRPs). In an example, the values of N$_p$ and N'$_p$ can be signaled from the network to the UE. In some examples, the values of N$_p$ and N'$_p$ can be determined based on negotiations between the network and the UE based on consideration of network capacity, number of UEs to be served, UE capabilities, UE requests, and the like.

In some examples, W$_0$ may be mapped to CRI feedback. In the case of a single TRP being used for transmission, a UE typically selects one CRI to feedback the best BS beam or a TRP selected from candidate TRPs for RI/PMI/CQI feedback. In the case of mTRP joint transmission (JT), the UE may select and report multiple CRIs mapping to multiple TRPs for NC-JT/C-JT RI/PMI/CQI feedback. There is a mapping relationship between the TRP selection matrix W$_0$ and the selection of CRIs (e.g., represented by a bit map).

For the report of W$_1$, in an example, in case of the structure of W=W$_0$W$_1$W$_2$W$_f^H$ being used, the UE can avoid feedback of W$_1$ information of non-selected TRPs. As shown in the Variant 1 structure in FIG. 17, the submatrix corresponding to the second TRP (TRP2) is not reported in the CSI report because the second TRP is not selected. In this way, a signaling cost can be saved. In the case of the structure of W=W$_1$W$_0$ W$_2$W$_f^H$ being used, the UE can still feedback W$_1$ information of non-selected TRPs.

For the report of W$_2$ and W$_f$, the UE can avoid reporting information of non-selected TRPs to save feedback overhead. For example, one or more indicators are predefined or configured for reporting the information carried in W$_2$ and W$_f$. For a TRP not selected, the respective indicators corresponding to the un-selected TRPs can be removed from being reported.

Iv. Examples of Apparatus for CSI Report for Distributed TRP Downlink Transmission In some embodiments, a user terminal (UT or UE) can include a controller containing at least one control unit, at least one channel estimator, at least two antenna groups (or panels) including at least one antenna, at least one receiver and transmitter. The UT can be configured to do CSI measurement and feedback by a cell or a node of a cellular network. The controller is configured to execute processes of receiving a CSI-RS resource configuration associating with a NZP-CSI-RS resource set associating at least two NZP-CSI-RS resources; receiving a report configuration associating with the CSI-RS resource configuration; and following the report configuration to measure the at least two NZP-CSI-RS resources and feedback a CSI report with at least one of co-phasing and amplitude differences among the CSI-RS resources.

In an example, the report configuration is associated (by RRC or MAC CE configurations) with at least one indicator to request the user terminal to feedback the CSI report with at least one of co-phasing differences or at least one of amplitude differences among the at least two NZP-CSI-RS resources.

In an example, the report configuration is associated (by RRC or MAC CE configurations) with at least one indicator to request the user terminal to measure the at least two NZP-CSI-RS resources by first, second, or multiple polarizations antennas and feedback the CSI report with the at least one of co-phasing and amplitude differences among the at least two NZP-CSI-RS resources.

In some examples, a user terminal can include a controller containing at least one control unit, at least one channel estimator, at least two antenna groups (or panels) including at least one antenna, at least one receiver and transmitter. The user terminal can be configured to perform CSI measurement and feedback by a cell or a node of a cellular network. The controller is configured to execute processes of Receiving a CSI-RS resource configuration associating with a NZP-CSI-RS resource set associating at least one NZP-CSI-RS resource; receiving a report configuration associating with the CSI-RS resource configuration; and flowing the report configuration to measure the at least two NZP-CSI-RS resources and feedback a CSI report with at least one of co-phasing and amplitude differences among port groups of the CSI-RS resources.

In an example, one of the port groups includes at least one antenna. The port groups of the NZP-CSI-RS resource set are configured by RRC or MAC CE configurations and associated with the report configuration or the CSI-RS resource configuration.

In an example, the report configuration is associated (by RRC or MAC CE configurations) with first at least one Channel Measurement Resource (CMR) and Interference Measurement Resource (IMR) combination to request the user terminal to measure the first at least one CMR and IMR combination and feedback at least one CSI for the first at least one CMR and IMR combination in the CSI report. One of the first at least one CMR and IMR combination includes at least one CMR selected from the at least two NZP-CSI-RS resources and at least one IMR.

In an example, the user terminal feedbacks a capability to indicate the maximum measurement capability for a CSI report. The user terminal selects and feedbacks at least one CSI in the CSI report under the first at least one CMR and IMR combination and the maximum measurement capability.

In an example, the user terminal selects at least one CMR and IMR combination in accordance with the report configuration to do CSI measurement and feedbacks the selection and at least one CSI for the at least one CMR and IMR combination in the CSI report.

In an example, the user terminal selects second at least one CMR and IMR combination in accordance with the report configuration except the first at least one CMR and IMR combination to do CSI measurement and further feedback at least one CSI for the second at least one CMR and IMR combination in the CSI report.

In an example, the user terminal selects at least one NZP-CSI-RS resource in accordance with the report configuration except NZP-CSI-RS resources of the first at least one CMR and IMR combination to do RSRP measurement and further feedback at least one NZP-CSI-RS resource index in the CSI report in accordance with the RSRP measurement results.

V. Exemplary CSI Acquisition Processes for Multiple TRP Coherent Joint Transmission (mTRP CJT)

Figure 18:
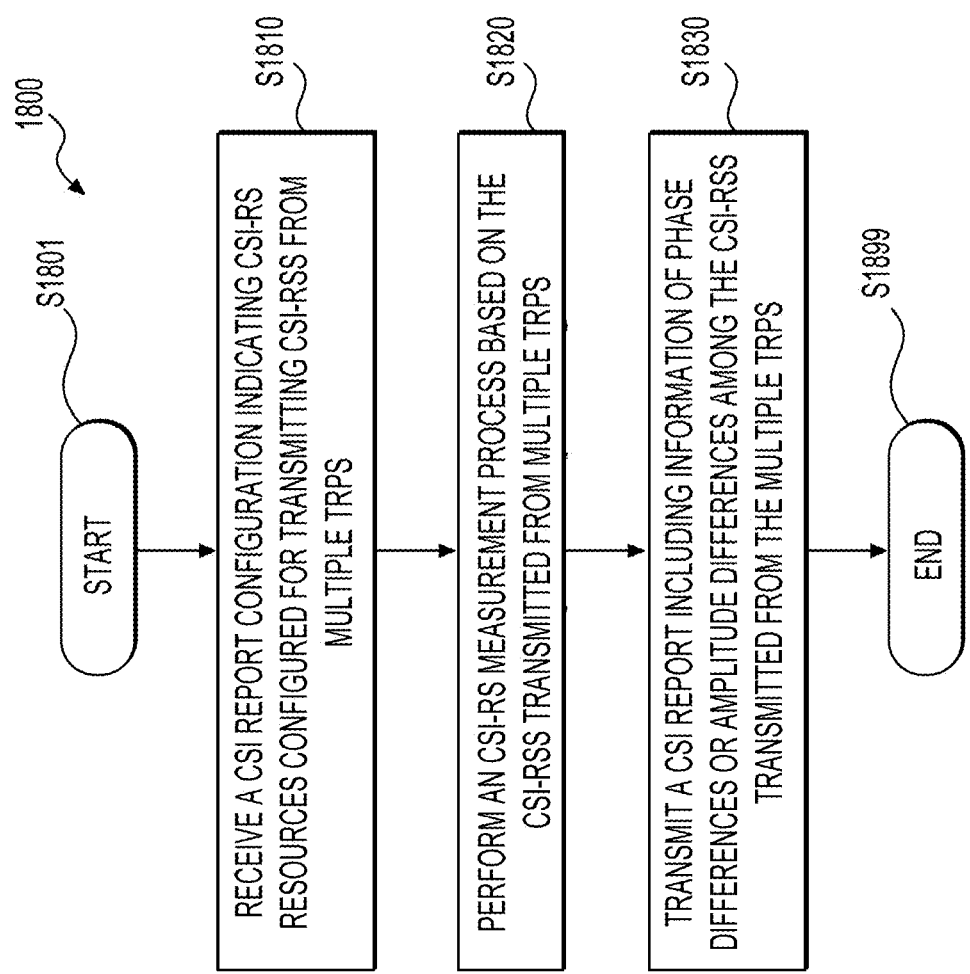
FIG. 18 shows a CSI report process 1800 according to embodiments of the disclosure.

FIG. 18 shows a CSI report process 1800 according to embodiments of the disclosure. During the process, co-phasing and amplitude differences of CSI-RS signals transmitted from multiple TRPs are measured at a UE and reported to a base station associated with the multiple TRPs. The process 1800 can start from S1801 and proceed to S1810.

At S1810, a CSI report configuration can be received at the UE from the base station. The CSI report configuration can indicate CSI-RS resources configured for transmitting CSI-RSs from the multiple TRPs.

At S1820, an CSI-RS measurement process can be performed at the UE based on the CSI-RSs transmitted from multiple TRPs using the CSI-RS resources indicated by the CSI report configuration.

At S1830, a CSI report based on the CSI report configuration is transmitted from the UE to the base station. The CSI report can include information of one or more phase differences or one or more amplitude differences among the CSI-RSs transmitted from the multiple TRPs. The process 1800 can proceed to S1899 and terminate at S1899.

Figure 19:
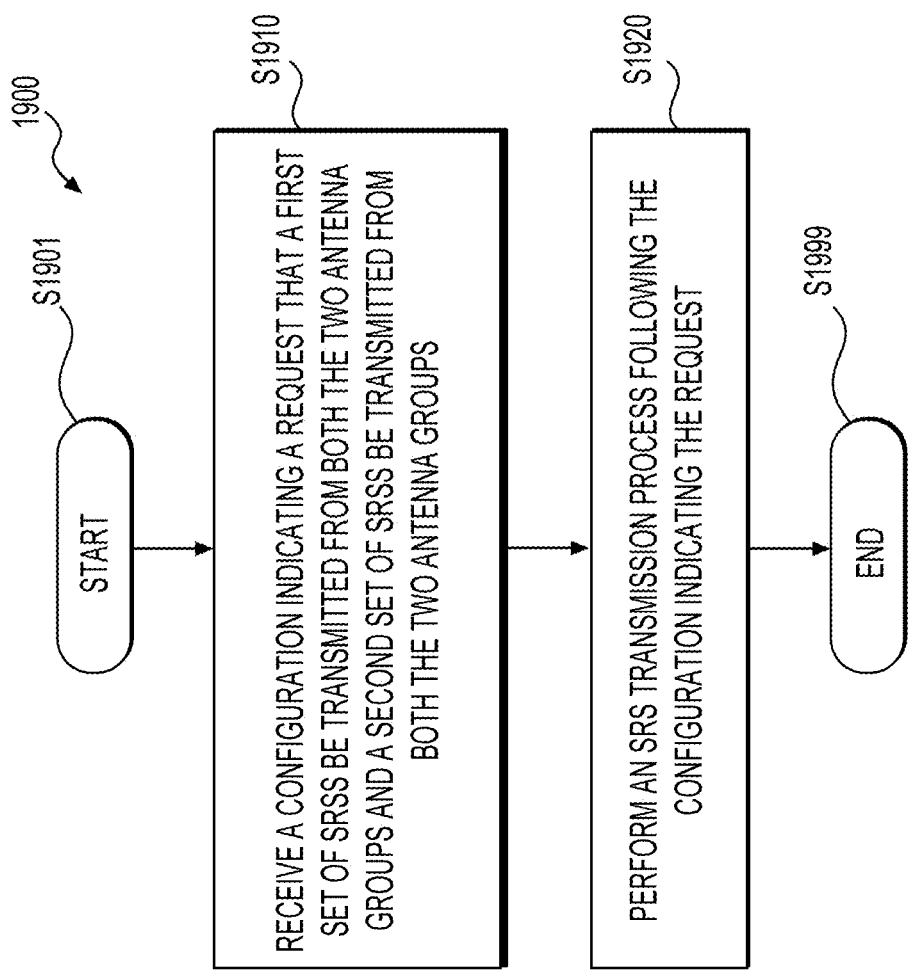
FIG. 19 shows a process 1900 for measuring co-phasing and amplitude differences of SRS signals received at multiple TRPs according to embodiments of the disclosure.

FIG. 19 shows a process 1900 for measuring co-phasing and amplitude differences of SRS signals received at multiple TRPs according to embodiments of the disclosure. The process 1900 can start from S1901 and proceed to S1910.

At S1910, a configuration can be received at a UE from a base station. The UE has two antenna groups. The configuration indicate a request that a first set of sounding reference signals (SRSs) be transmitted from first antennas of both the two antenna groups, and a second set of SRSs be transmitted from second antennas of both the two antenna groups. In an example, antennas of each antenna group have a same polarization. In an example, antennas of each antenna group having two polarizations, the first antennas of both the two antenna groups have a first one of the two polarizations, and the second antennas of both the two antenna groups have a second one of the two polarizations.

At S1920, an SRS transmission process can be performed by the UE following the configuration indicating the request. The base station can measure the first set and second set of SRSs received at the multiple TRPs associated with the base station. The base station can determine phase differences or amplitude differences of the SRSs received at the multiple TRPs based on measurement results. The base station can then determine a precoder for downlink transmission based on the phase differences or amplitude differences and apply the precoder to signals transmitted from the multiple TRPs to the UE. The process 1900 can proceed to S1999 and terminates at S1999.

FIG. 20 shows a process 2000 for dynamic TRP selection according to embodiments of the disclosure. The process 2000 can start from S2001 and proceed to S2010.

At S2010, a CSI report configuration can be received at a UE from a base station. The CSI report configuration indicates CSI-RS resources configured for transmitting CSI-RSs from multiple TRPs. The CSI report configuration further indicates a report quantity to request the UE to report CSI information of preferred CRIs corresponding to ones of the CSI-RS resources indicated by the CSI report configuration. The preferred CRIs correspond to preferred TRPs selected from the multiple TRPs by the UE or the base station.

At S2020, a CSI-RS measurement can be performed at the UE based on the CSI-RSs transmitted from the multiple TRPs using the CSI-RS resources indicated by the CSI report configuration, At S2030, a CSI report based on the CSI report configuration can be transmitted from the UE to the base station. The CSI report indicates the preferred CRIs corresponding to the preferred TRPs selected from the multiple TRPs by the UE or the base station and the CSI information associated with the preferred CRIs. The process 2000 can proceed to S2099 and terminates at S2099.

VI. Exemplary Apparatus

FIG. 21 shows an exemplary apparatus 2100 according to embodiments of the disclosure. The apparatus 2100 can be configured to perform various functions in accordance with one or more embodiments or examples described herein. Thus, the apparatus 2100 can provide means for implementation of mechanisms, techniques, processes, functions, components, systems described herein. For example, the apparatus 2100 can be used to implement functions of UEs or BSs in various embodiments and examples described herein. The apparatus 2100 can include a general purpose processor or specially designed circuits to implement various functions, components, or processes described herein in various embodiments. The apparatus 2100 can include processing circuitry 2110, a memory 2120, and a radio frequency (RF) module 2130.

In various examples, the processing circuitry 2110 can include circuitry configured to perform the functions and processes described herein in combination with software or without software. In various examples, the processing circuitry 2110 can be a digital signal processor (DSP), an application-specific integrated circuit (ASIC), programmable logic devices (PLDs), field programmable gate arrays (FPGAs), digitally enhanced circuits, or comparable device or a combination thereof.

In some other examples, the processing circuitry 2110 can be a central processing unit (CPU) configured to execute program instructions to perform various functions and processes described herein. Accordingly, the memory 2120 can be configured to store program instructions. The processing circuitry 2110, when executing the program instructions, can perform the functions and processes. The memory 2120 can further store other programs or data, such as operating systems, application programs, and the like. The memory 2120 can include non-transitory storage media, such as a read-only memory (ROM), a random access memory (RAM), a flash memory, a solid-state memory, a hard disk drive, an optical disk drive, and the like.

In an embodiment, the RF module 2130 receives a processed data signal from the processing circuitry 2110 and converts the data signal to beamforming wireless signals that are transmitted via antenna arrays 2140, or vice versa. In some examples, the RF module 2130 can include a digital to analog converter (DAC), an analog to digital converter (ADC), a frequency up-converter, a frequency down-converter, filters and amplifiers for reception and transmission operations. In some examples, the RF module 2130 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 2140 can include one or more antenna arrays organized in multiple antenna panels or antenna groups.

The apparatus 2100 can optionally include other components, such as input and output devices, additional or signal processing circuitry, and the like. Accordingly, the apparatus 2100 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer-readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid-state memory, magnetic tape, a removable computer diskette, a random access memory (RAM), a read-only memory (ROM), a magnetic disk and an optical disk, and the like. The computer-readable non-transitory storage medium can include all types of computer-readable medium, including magnetic storage medium, optical storage medium, flash medium, and solid-state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   receiving a channel state information (CSI) report configuration at a user equipment (UE) from a base station, the CSI report configuration indicating CSI reference signal (CSI-RS) resources configured for transmitting CSI-RSs from multiple transmission and reception points (TRPs);
   performing at the UE an CSI-RS measurement process based on the CSI-RSs transmitted from the multiple TRPs using the CSI-RS resources indicated by the CSI report configuration; and
   transmitting from the UE to the base station a CSI report based on the CSI report configuration, the CSI report including information of one or more phase differences or one or more amplitude differences among the CSI-RSs transmitted from the multiple TRPs, wherein the information of one or more phase differences or one or more amplitude differences among the CSI-RSs transmitted from the multiple TRPs is represented by a UE-selected phase and amplitude compensation factor.

2. The method of claim 1, wherein the CSI-RS resources indicated by the CSI report configuration include multiple CSI-RS resources that are included in a CSI-RS resource set and correspond to the multiple TRPs, respectively.

3. The method of claim 1, wherein the CSI-RS resources indicated by the CSI report configuration include multiple CSI-RS resources that are included in a CSI-RS resource set and correspond to the multiple TRPs, respectively,
   the multiple CSI-RS resources that are included in the CSI-RS resource set and correspond to the multiple TRPs are organized into CSI-RS resource groups, each CSI-RS resource group including at least one of the multiple CSI-RS resources.

4. The method of claim 1, further comprising:
receiving a downlink control information (DCI) including a selection field for indicating measurement targets, the selection field indicating a codepoint in a CSI-RS resource combination table configured by radio resource control (RRC) or medium access control (MAC) control element (CE), the codepoint corresponding to a combination of CSI-RS resources that are a subset of the CSI-RS resources indicated by the CSI report configuration.

5. The method of claim 1, wherein the one or more phase differences or one or more amplitude differences among the CSI-RSs transmitted from the multiple TRPs in the CSI report correspond to at least one of two antenna polarizations of antennas of the UE.

6. The method of claim 1, further comprising:
transforming an arriving timing difference detected at the UE between two of the CSI-RSs transmitted from the multiple TRPs to a phase difference of the one or more phase differences among the CSI-RSs transmitted from the multiple TRPs in the CSI report.

7. The method of claim 1, wherein the CSI report configuration indicates the CSI report is a coherent joint transmission (C-JT) CSI report, and the CSI report includes a precoder matrix indicator (PMI) indicating a precoder that indicates the information of one or more phase differences or one or more amplitude differences among the CSI-RSs transmitted from the multiple TRPs.

8. The method of claim 1, wherein the CSI report configuration indicates the CSI report is a non-coherent joint transmission (NC-JT) CSI report, and
the CSI report includes multiple PMIs that correspond to CSI-RS resources in a CSI-RS resource set, respectively or correspond to CSI-RS resource groups of a CSI-RS resource set, and the CSI report further includes information of one or more phase differences or one or more amplitude differences among the CSI-RS resources in the CSI-RS resource set or the CSI-RS resource groups of the CSI-RS resource set.

9. The method of claim 1, further comprising:
receiving a configuration indicating multiple combinations of CSI-RS resources in a CSI-RS resource set, members of each combination of the multiple combinations of the CSI-RS resources in the CSI-RS resource set belonging to different CSI-RS resource groups, wherein
the CSI report includes multiple PMIs that correspond to members of each combination of the CSI-RS resources in the CSI-RS resource set, respectively.

10. A method, comprising:
receiving a channel state information (CSI) report configuration at a user equipment (UE) from a base station, the CSI report configuration indicating CSI reference signal (CSI-RS) resources configured for transmitting CSI-RSs from multiple transmission and reception points (TRPs), the CSI report configuration indicating a report quantity to request the UE to report CSI information of preferred CSI-RS resource indicators (CRIs) corresponding to ones of the CSI-RS resources indicated by the CSI report configuration, the preferred CRIs corresponding to preferred TRPs selected from the multiple TRPs by the UE or the base station,
performing at the UE a CSI-RS measurement based on the CSI-RSs transmitted from the multiple TRPs using the CSI-RS resources indicated by the CSI report configuration; and
transmitting from the UE to the base station a CSI report based on the CSI report configuration, the CSI report indicating the preferred CRIs corresponding to the preferred TRPs selected from the multiple TRPs by the UE or the base station and the CSI information of the preferred CRIs.

11. The method of claim 10, further comprising:
receiving from the base station at the UE an indication of base-station-selected one or more combinations of CSI-RS resources that are a subset of the CSI-RS resources indicated by the CSI report configuration, wherein
the CSI report provides CSI corresponding to each of the base-station-selected one or more combinations of the CSI-RS resources, each of the base-station-selected one or more combinations of CSI-RS resources being represented, in the CSI report, by a bitmap or an indicator provided in the CSI report configuration, the base-station-selected one or more combinations of CSI-RS resources corresponding to the preferred CRIs.

12. The method of claim 10, wherein
the CSI report indicates UE-selected one or more combinations of the CSI-RS resources as preferred combinations of the CSI-RS resources and provides CSI corresponding to each of the preferred combinations of the CSI-RS resources, each of the preferred combinations of the CSI-RS resources being represented, in the CSI report, by a bitmap or an indicator provided in the CSI report configuration, the preferred combinations of the CSI-RS resources corresponding to the preferred CRIs.

13. The method of claim 10, wherein the CSI report indicates a precoder corresponding to one or more un-preferred TRPs selected from the multiple TRPs by the UE or the base station.

14. The method of claim 10, wherein the CSI report configuration indicates a report of a TRP selection matrix W0 from the UE, and
the CSI report includes a TRP selection indicator to represent the TRP selection matrix W0, the TRP selection indicator being in a range of
$\{0, 1, 2, \ldots,$ $\binom{N_p}{N'_p}\},$ where $N_p$ is a number of the multiple TRPs configured by the base station $N'_p$ is a number of the preferred TRPs selected from the multiple TRPs by the UE, and $\binom{N_p}{N'_p}$ is a number of combinations of selecting $N'_p$ TRPs from $N_p$ candidate TRPs.

15. The method of claim 14, wherein the CSI information indicated in the CSI report indicates a precoder corresponding to the preferred TRPs and selected from a downlink Type II codebook having a codebook structure of $W=W_0 W_1 W_2 W_f^H$, $W_0$ being the TRP selection matrix, $W_1$ representing wideband spatial domain (SD) basis vectors, $W_2$ representing frequency domain (FD) compressed coefficients linearly combining the wideband SD basis vectors to form transmission layers, and $W_f^H$ representing DFT vectors used for FD compression, and elements in the downlink Type II codebook $W_1$, $W_1$, and $W_f^H$ related to non-selected TRPs among the multiple TRPs are not reported in the CSI report.

16. The method of claim 14, wherein the CSI information indicated in the CSI report indicates a precoder corresponding to the preferred TRPs and selected from a downlink Type II codebook having a codebook structure of $W=W_1 W_0 W_2 W_f^H$, $W_0$, being the TRP selection matrix, $W_1$ representing wideband spatial domain (SD) basis vectors, $W_2$ representing frequency domain (FD) compressed coefficients linearly combining the wideband SD basis vectors to form transmission layers, and $W_f^H$ representing DFT vectors used for FD compression, and elements in the downlink Type II codebook related to non-selected TRPs among the multiple TRPs are not reported in the CSI report.

17. A method, comprising:

receiving a channel state information (CSI) report configuration at a user equipment (UE) from a base station, the CSI report configuration indicating CSI reference signal (CSI-RS) resources configured for transmitting CSI-RSs from multiple transmission and reception points (TRPs), and wherein the CSI-RS resources indicated by the CSI report configuration include a multiple-port CSI-RS resource in a CSI-RS resource set;

receiving a configuration that maps CSI-RS ports of the multiple-port CSI-RS resource to the multiple TRPs;

performing at the UE an CSI-RS measurement process based on the CSI-RSs transmitted from the multiple TRPs using the CSI-RS resources indicated by the CSI report configuration; and transmitting from the UE to the base station a CSI report based on the CSI report configuration, the CSI report including information of one or more phase differences or one or more amplitude differences among the CSI-RSs transmitted from the multiple TRPs, wherein the information of one or more phase differences or one or more amplitude differences among the CSI-RSs transmitted from the multiple TRPs is represented, in the CSI report, as one or more phase differences or one or more amplitude differences among the CSI-RS ports of the multiple-port CSI-RS resource mapped to the multiple TRPs.

\* \* \* \* \*